United States Patent
Miles et al.

(10) Patent No.: US 6,886,044 B1
(45) Date of Patent: Apr. 26, 2005

(54) METHOD AND SYSTEM HAVING REQUIREMENTS MATCHING SERVERS FOR PROCESSING USER MESSAGES

(75) Inventors: Andrew John Mark Miles, Suffolk (GB); Ian David Edmund Videlo, Suffolk (GB); Simon Steward, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/719,296

(22) PCT Filed: Jun. 30, 1999

(86) PCT No.: PCT/GB99/02062

§ 371 (c)(1),
(2), (4) Date: Dec. 11, 2000

(87) PCT Pub. No.: WO00/03342

PCT Pub. Date: Jan. 20, 2000

(30) Foreign Application Priority Data

Jul. 8, 1998 (EP) ............................................. 98305421
Jul. 8, 1998 (GB) ............................................. 9814836

(51) Int. Cl.[7] ........................................... G06F 15/173
(52) U.S. Cl. .................... 709/238; 709/201; 709/203; 709/227; 709/228; 707/10
(58) Field of Search ................................ 709/200–203, 709/206–207, 217–219, 227–229, 238, 104–105; 707/10, 104; 705/26

(56) References Cited

U.S. PATENT DOCUMENTS

| | | | | |
|---|---|---|---|---|
| 5,548,724 A | * | 8/1996 | Akizawa et al. | 709/203 |
| 5,678,041 A | * | 10/1997 | Baker et al. | 709/229 |
| 5,765,033 A | * | 6/1998 | Miloslavsky | 709/206 |
| 5,948,054 A | * | 9/1999 | Nielsen | 709/200 |
| 6,035,104 A | * | 3/2000 | Zahariev | 709/203 |
| 6,047,268 A | * | 4/2000 | Bartoli et al. | 705/35 |
| 6,092,100 A | * | 7/2000 | Berstis et al. | 709/203 |
| 6,640,243 B1 | * | 10/2003 | Phillips et al. | 709/201 |

FOREIGN PATENT DOCUMENTS

| | | | | |
|---|---|---|---|---|
| WO | WO 96/23265 | 8/1996 | ........... | G06F/17/30 |
| WO | WO 97/21183 | 6/1997 | ........... | G06F/15/00 |

* cited by examiner

*Primary Examiner*—Bharat Barot
(74) *Attorney, Agent, or Firm*—Nixon & Vanderhye P.C.

(57) ABSTRACT

A requirements matching broker is provided for use in a requirements matching system. The broker receives messages from users or from other brokers, conveying a statement of requirements, via a communications network interface. The broker includes a store and means to store predetermined rules for routing received messages. A rule includes a statement of requirements and the identity of a corresponding destination. On receipt of a message, the broker performs a comparison of a statement of requirements conveyed by the message with a statement of requirements contained within a stored routing rule. On finding a match, the broker identifies, from the matching routing rule, the identity of a destination for routing the received message and transmits the message to the identified destination via the network interface.

20 Claims, 6 Drawing Sheets

| RP_ID | RP ORIGINATOR (DESTINATION) | ADDRESS TYPE | RP EXPIRY DATE | LAST REAFFIRMED DATE | REQUIREMENT SPECIFICATION |
|---|---|---|---|---|---|
| 300 | 305 | 310 | 315 | 320 | 325 |

METHOD AND SYSTEM HAVING REQUIREMENTS MATCHING SERVERS FOR PROCESSING USER MESSAGES

BACKGROUND OF THE INVENTION

1. Field of the Invention

The invention relates to electronic commerce and finds particular application in matching requirements of an originator to a potential supplier.

2. Related Art

The Internet is a multimedia computer communications network built on worldwide telephone and data networks. Over 100,000 servers of various types are connected to the Internet providing a publicly accessible distributed data store. A server holding files of information as data accessible using an Internet communication protocol called the "HyperText Transfer Protocol" (HTTP) is known as an "HTTP server". Data files stored on HTTP servers and accessible by means of HTTP are known as "web pages" which together form the "World Wide Web", or simply the "WEB". Web pages are written using a special WEB language called HyperText Markup Language (HTML) creating links to other pages on the WEB, as appropriate, and providing a means to navigate through information on the WEB. Information held on the WEB and intended for public access is accessible to anyone having a computer connected to the Internet and with an interest in accessing such information. Access to certain information may be restricted by means of closed user groups for example. An HTTP Uniform Resource Locator (URL) has been adopted as a WEB standard to provide a consistent international naming convention to uniquely identify the location of any WEB resource, including for instance documents, programs, sound and video clips. The HTTP enables URL-identified files (web pages) to be located and transferred for reproduction at user equipment connected to the Internet. Underlying transport protocols, primarily TCP/IP, enable network connections to be established between an Internet user and a point of access to the Internet made available, typically, by an Internet service provider. Anyone may register with a local Internet service provider to gain access to the Internet communications infrastructure and to be allocated a unique Internet network address. Internet service providers may also lease server capacity to enable a registered user to establish their own "site" on the Internet, identifiable by a unique URL, to store their own WEB pages and make them available to other Internet users. Commercial Internet users may provide and maintain their own servers for this purpose.

Internet users may access information on the WEB using proprietary WEB browser products running on personal computers (PCs) or workstations linked to the Internet. WEB browsers communicate with WEB resources using standard Internet protocols to download selected web pages, interpret embedded HTML commands inserted at the time of mark-up by web page authors and, if appropriate, display those pages graphically. Browsers are available to reproduce multi-media files transferred over the Internet.

It is known for a produce supplier to establish their own "site" on the Internet and to provide a "storefront" user interface allowing prospective buyers with Internet access to browse the supplier's product range. In some cases a buyer may specify their product requirements using a template provided at the supplier's user interface and, in response, product choices may be reported from the supplier's product range, specifically matching the user's stated requirements. However, the flexibility provided in such cases is limited, particularly in the specification of requirements. A buyer must also identify and visit other product supplier Internet sites separately, each site having a different user interface, to examine alternative products meeting a given requirements specification.

It is also known for a third party Internet user to provide a managed front end to a community of product or information suppliers of a given type. A prospective buyer, for example, may specify their product requirements using a template provided by a user interface to the third party managed front end and automatically trigger a search of each community product supplier's database for matching products. A buyer may then order a product from a selected supplier using the same managed front end. For example, managed front ends currently available on the Internet include, for books, that provided at http://amazon.com/ and, for cars, that offered by "Auto-By-Tel" at http://www.auto-by-tel.com/. However, managed front ends tend to relate to a particular product type only and cover a limited range of suppliers. Often, a managed front end may offer access to a range of suppliers having complementary product ranges, with less competition on price between those suppliers than may be available outside. To find a more competitively priced product a buyer may need to locate and visit alternative product supplier sites individually.

It is also known to provide an Internet search engine arranged to interrogate a local database of collated product information and report the Internet location of a specified item of information. The more efficient a search algorithm and the larger the local database, the more accurate may be the results obtained. However, it is difficult to provide a user interface to satisfy the needs of all users in searching for product information, a fact emphasised by the myriad of search engines currently available. Even having found a number of promising suppliers from the search results, the user must still visit each site individually. Better known suppliers tend to stand out from such a search more than small or medium-sized enterprises (SMEs) and users tend to be attracted to well-known names.

International patent application PCT/US96/19509 describes a targetted advertising system wherein user requests for information, such as those submitted over the Internet, are intercepted by the advertising system. The system analyses the user request and, by means of predetermined rules linking merchant advertising material, to particular categories of user request, a relevant category of advertising material is selected from a store of such material and inserted within or provided along with intercepted pages of information being returned in response to the user request.

SUMMARY OF THE INVENTION

According to a first aspect of the present invention there is provided a requirements matching server for use in a requirements matching system comprising at least one requirements matching server accessible by means of a communications network, said requirements matching server having:

an input for receiving a user request message by means of said communications network, wherein a user request message comprises a specification of user requirements and an identifier for a response contract; and routing means for forwarding a received specification of requirements to a destination determined by said routing means and accessible by means of said communications network, wherein said routing means comprise:

a store for storing at least one routing rule for controlling said routing means, wherein a routing rule comprises a specification of requirements to be routed and an identifier for a corresponding destination;

comparison means for comparing a specification of user requirements conveyed by a received user request message with a specification of requirements to be routed as defined in a stored routing rule and, in dependence upon the result of said comparison, identifying a corresponding destination for the forwarding of said specification of user requirements; and forwarding means for transmitting, by means of said communications network, a message conveying a specification of user requirements to a destination identified by said comparison means.

The present invention may provide a requirements matching system having one or more requirements matching servers (also referred to in the detailed description as "brokers" to which users may submit requirements, preferably by means of a standard interface to the system, and those requirements will be routed through the system of requirements matching servers and delivered to any supplier "registering" an interest with the system in receiving such requirements. In this way, any "registered" supplier may have the opportunity to respond to a user's requirements, increasing the probability that a user will find the best source of information or the best deal in a commercial transaction across a wide range of interests.

A system of requirements matching servers of the present invention may operate in a "distributed" computing arrangement whereby a number of servers are provided across a network, each server specialising in or sharing in the matching and routing of different types of user requirements. However, the invention may also be implemented using a single requirements matching server to match and route all user requirements to potential suppliers.

A user of the requirements matching system may submit a requirement specification to the system, over the communications network, conveyed within a message. The requirement specification may be expressed in a standard format and may comprise requirement definitions selected from an agreed requirements classification scheme. Suppliers may "register" interests in receiving requirements messages by means of routing rules stored at particular requirements matching servers within the system. A supplier may define his or her particular interest by means of a requirement specification expressed according to the same agreed format and classification scheme and may arrange for that specification to be stored at a requirements matching server in the form of a routing rule, including within the rule the supplier's network address within the communications system. When the requirements matching server receives a requirement message from a user, the server will forward the user's requirement message to any supplier whose routing rule contains a similar requirements specification.

Preferably, the requirements matching server includes registration means arranged, on receipt of a message conveying a message routing rule, to store said message routing rule. In this way, a supplier may send messages to particular servers within the system to store routing rules defining his or her particular interests.

The servers registration means may also be arranged to generate a message including a message routing rule and to transmit the generated message to another requirements matching server. In that way, requirements matching servers may themselves send messages to store routing rules with other servers within the system in order to create specialisms among servers within the system for receipt and forwarding of requirements messages of particular types. In this way the various supplier domains may advantageously be divided into manageable portions. A system in which requirements matching servers specialise in particular, but preferably broad categories of requirement type, the number of routing rules that a supplier may need to store may be minimised. That is, a supplier with a particular interest may need to store a routing rule with only a single server in the system in the knowledge that that server will ultimately receive all relevant requirements messages from users.

Preferably, the broker may include:

information extraction means for extracting a predetermined type of information from a received user request message, prior to forwarding by the routing means of a specification of user requirements contained therein, and for storing the extracted information; and means responsive, on receipt of a message conveying a request to supply said extracted information, to transmit to the sender of the extracted message information request a message including said extracted information.

Certain information conveyed within messages from users of the system may be deemed of value to suppliers. For example, a user's identity and return address for response may be an item of information for which a supplier may be willing to pay a fee to the system provider in order to be able to respond to the user's requirement message. The ability of a requirements matching server to extract certain information from a received message and to store that information before forwarding the remains of the received message to suppliers, is an enabler for a number of possible payment systems and business models.

The applicant's co-pending European patent application number 97310097.7 (United Kingdom cotemporaneous equivalent, number 9726484.0) relates a method of providing content to users in a data communications system and a method of charging for content. Such methods may be applied to the supply and charging for information by requirements matching servers within a requirements matching system according to the present invention. The subject matter of the above-referenced equivalent patent applications is hereby incorporated by reference.

The requirements matching server may include billing means arranged, on receipt of the request message to supply extracted information, to raise a charge against the sender of said request message for payment of a fee as consideration for supply of said extracted information. The billing means may retain an account in respect of a particular supplier, enabling collated bills to be submitted to the supplier at agreed intervals, or each message from the supplier requesting supply of extracted information may be accompanied by an electronic payment according to a known electronic payment system.

In another aspect there is provided a requirements matching system, having at least one requirements matching server arranged with access to a communications network, wherein said at least one requirements matching server includes:

an input for receiving a user request message by means of said communications network, wherein a user request message comprises a specification of user requirements and an identifier for a response contact; and routing means for forwarding a received specification of user request message to a destination determined by said routing means and accessible by means of said communications network, wherein said routing means comprise:

a store for storing at least one routing rule for controlling said routing means, wherein a routing rule comprises a specification of requirements to be routed and an identifier for a corresponding destination;

comparison means for comparing a specification of user requirements conveyed by a received user request message with a specification of requirements to be routed as defined in a stored routing rule and, in dependence upon the result of said comparison, identifying a corresponding destination for the forwarding of specification of said user requirements; and forwarding means for transmitting, by means of said communications network, a message conveying a specification of user requirements to a destination identified by said comparison means.

Preferably, the requirements matching system includes first and second access provision means each having an interface to said communication network, wherein said first access provision means include means to enable a first user to transmit, over said communications network to said at least one requirements matching server, a message including a requirement specification defined according to a predetermined representation scheme, and wherein said second access provision means include means to enable a second user to receive a message transmitted by a requirements matching broker, including the requirements specification transmitted by said first user.

In a further aspect there is provided a method of routing a a specification of suer requirements from a user to a potential supplier, the method comprising:

receiving a request message conveying said specification of user requirements;

comparing the specification of requirements conveyed by said received request message with a specification of supplier deliverables defined in each rule of a set of at least one routing rule wherein a routing rule comprises a specification of supplier deliverables and an identifier for a corresponding forwarding destination;

in dependence upon the result of said comparison, identifying a forwarding destination corresponding to said specification of user requirements; and transmitting a message, including said specification of user requirements to said identified forwarding destination.

In a yet further aspect there is provided a method of routing a buyer's requirements for goods or services to a potential supplier of said goods or services in an electronic trading system, comprising the steps of:

(i) storing at least one routing rule; and each routing rule comprising, for a given supplier, a specification of goods or services defined by said supplier and an address for said supplier, each said specification being defined according to a predetermined representation scheme;

(ii) receiving a specification of goods or services required by said buyer defined using the same said predetermined representation scheme as in (i);

(iii) comparing the buyer specification from (ii) with a supplier specification defined in said at least one routing rule;

(iv) identifying a supplier address in dependence upon said comparison; and (v) forwarding the buyer specification to the supplier address identified at (iv).

BRIEF DESCRIPTION OF THE DRAWINGS

The invention will now be described in more detail, by way of example only, with reference to the accompanying drawings of which:

FIG. 3 is a diagram showing the format of a preferred routing preference for use in embodiments of the invention;

DETAILED DESCRIPTION OF EXEMPLARY EMBODIMENTS

The detailed description will begin with a description of the functional components of a requirements matching system according to embodiments of the invention, including an overview of the operation of each component. There will then follow a description of embodiments of the invention in a typical operational configuration, including an overview of how such a system may typically be used in the context of an electronic trading system application. Before describing the operation of key components of the system in more detail, a preferred requirements classification scheme and a top-level message protocol and their application to SOR specification and SOR message transmission will be described. The more detailed description will then be set in the context of the preferred requirements classification scheme and the top-level message protocol.

Overview of a Requirements Matching System

Figure 1:
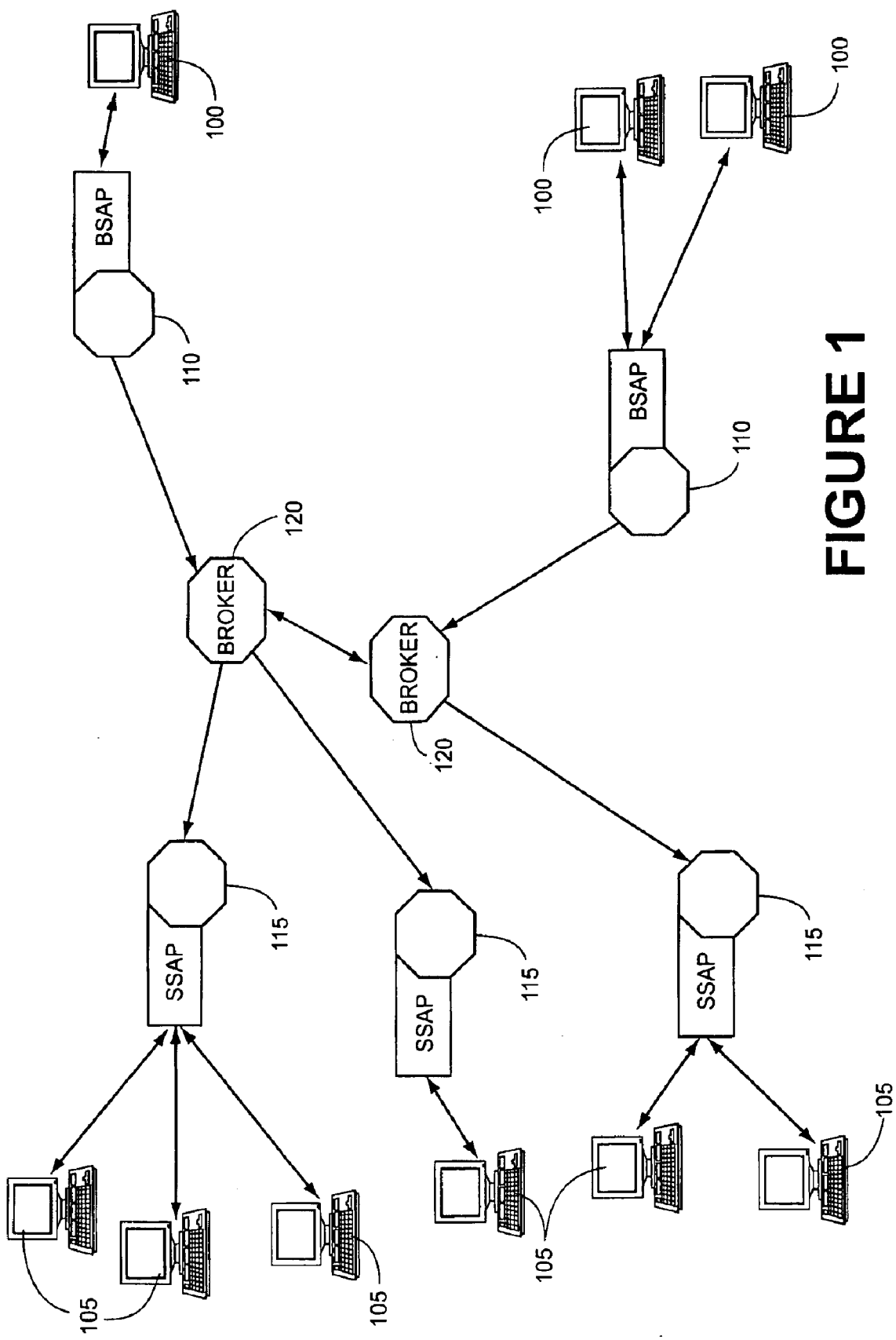
FIG. 1 is a diagram showing users and components of a requirements matching framework according to preferred embodiments of the invention.

Referring to FIG. 1, a diagram is provided showing, in overview, components of a requirements matching system in use according to a typical application of embodiments of the invention. The diagram indicates logical paths of communication with user equipment and illustrates three main types of equipment involved in applications of the invention. At the top level, embodying the 'core' functionality of the invention, is a network of one or more "requirements brokers" 120 arranged to route requirements, expressed for example as text within an electronic data message, from a point of entry to the system to one or more points of delivery from the system according to predetermined routing conditions implemented by the brokers 120. Points of entry to the system and points of delivery from the system may be provided from "Service Access Providers" (SAPs) 110 and 115 respectively. All user access to the system may be provided from SAPs. Preferably, SAPs may be of two types: one providing access for users creating and launching requirements messages and one providing access for users intending to receive requirements messages. The former may be referred to as a "Buyer" SAP—BSAP 110—and the latter a "Supplier" SAP—SSAP 115. This "buyer-supplier" terminology arises in the context of an electronic commerce application, in particular an electronic trading system—a typical application of embodiments of the invention. In that context, a buyer (100) aiming to acquire a product or service of a particular description may create a "Statement of Requirements" (SOR) to specify the product or service sought and launch a message containing the SOR into a trading system of brokers 120, using facilities provided by a BSAP 110, as an invitation to potential suppliers to tender for the specified product or service. Embodiments of the invention may be arranged to route and deliver the buyer's SOR message to one or more potential suppliers (105) via their serving SSAPs 115 according to predefined interests of those suppliers in receiving SORs relating to that product or service. User terminal equipment 100, 105 may comprise conventional terminal equipment 100, personal computers (PCs) for example, equipped with a suitable network interface and linked to a communications network providing access to an appropriate SAP.

Brokers 120 may route an SOR message from a BSAP 110 to one or more SSAPs 115 according to predetermined routing conditions implemented by each broker 120. Preferably, the predetermined routing conditions may embody, in particular, the pre-determined interests of suppliers in receiving SORs of particular types. A broker 120 may distinguish an SOR for routing purposes according to its "type", for example according to the type of product or service it specifies. The types of product or service recognised by brokers 120 may be defined according to a predetermined SOR classification system. Examples of known object classification systems include that by Dun & Bradstreet™. Each predetermined routing condition implemented by a broker 120 may therefore be expressed in terms of a recognisable product or service type, defining a destination for routing by the broker of SOR messages specifying a product or service of that particular type. Each broker 120 may operate, typically, to a different set of routing conditions. Thus, a broker 120 or an SSAP 115 may be arranged, by means of the routing conditions implemented by other brokers 120, to specialise in receiving SOR messages of one or more particular types only.

Figure 2:
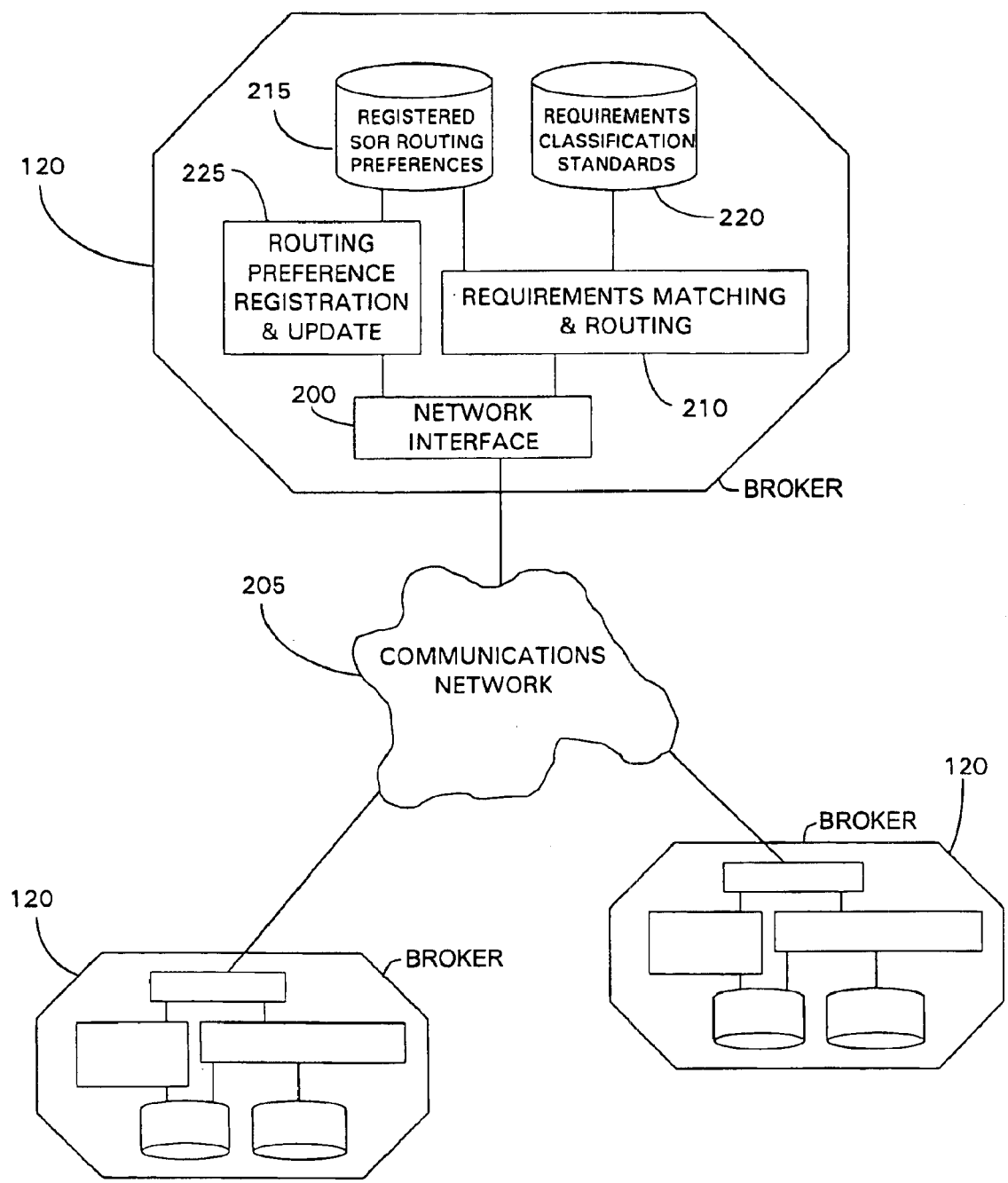
FIG. 2 is a diagram showing the main components of a requirements matching broker operating within a network of requirements matching brokers according to a first embodiment of the invention.

Referring to FIG. 2, a requirement matching system is shown employing a broker 120 according to a first embodiment of the invention, the broker 120 shown being one of a network of similar brokers participating in the system, linked by a common communications network 205, the public Internet for example. Preferably, the broker 120 may have a network interface 200 arranged with access to the communications network 205 for the receipt and forwarding of messages. Preferably the network interface 200 may be arranged to implement appropriate communications protocols such as TCP/IP and HTTP to establish network connections and to transport messages across the communications network 205. The network interface 200 may also maintain a record of addressing information allocated to the broker 120 in respect of its connection(s) to the communications network 205, for example an IP address.

As shown in FIG. 2, the broker 120 may also have a Requirements Matching and Routing module 210, a store of Registered SOR Routing Preferences (RPs) 215, a Routing Preference Registration & Update module 225 and may have, or be arranged with access to, a reference store of Requirements Classification Standards 220. The store of Registered RPs 215 contains predetermined routing conditions to be implemented by that broker in routing received SOR messages. In particular, the Requirements Matching and Routing module 210 may be arranged, on receipt of an SOR message via the network interface 200, to identify the type of requirement specified by the received SOR and to determine, from any RPs (215) registered in respect of the identified requirement type, one or more destinations for routing the SOR message. Having determined one or more intended destinations for the received SOR message, the matching and routing module 210 may arrange to forward the SOR message to each determined destination over the communications network 205 via the network interface 200.

Preferably, the matching and routing module 210 may implement a higher level protocol, operating above HTTP and other transport or application-level protocols, to control the forwarding of requirements-related messages within the requirements matching system. An "Open Messaging Protocol" (OMP) for use at this higher level will be defined and described later in this specification. Advantageously, each participating node within the requirements matching system may be allocated on identifier, each identifier being unique within the system, for use by the OMP. Such identifiers may be less prone to change than the underlying network addresses.

The matching and routing module 210 may access the reference store of requirement classification standards 220, containing valid requirement types, to identify and validate the type of requirement conveyed by the received SOR message. Preferably, a local controlled copy of the reference store 220 may be held within the broker 120, but optionally a remote reference store may be accessible by the broker 120 via the communications network 205 as required.

Referring to FIG. 3, the preferred format of a routing preference is shown for use in embodiments of the invention. RPs such as that shown in FIG. 3 may be stored and maintained as text records in an indexed database file for example, in the store of registered SOR RPs 215, by the RP Registration and Update module 225. The routing preference format of FIG. 3 comprises: a field 300 to contain a reference uniquely identifying the RP within the RP store 215; a field 305 to contain the identity of the originator of the RP, that is, the destination address for forwarding matching SOR messages; a field 310 to indicate the type of address specified in field 305 to identify the originator (destination), distinguishing an "OMP" identifier from a "DNS" (domain name servicer) domain name or "IP" (Internet Protocol) address for example; a field 315 to contain the expiry date of the RP as defined by the RP originator; a field 320 to contain the date of last affirmation of RP validity as defined by the RP originator; and a field 325 containing the specification of the type of requirement that the RP originator would prefer to receive.

The requirement specification field 325 defines a requirement using valid requirement definitions selected from those stored in the standards store 220. The originator (destination) field 305 may preferably contain the OMP-allocated identifier of the RP originator. Alternatively, in the absence of an OMP implementation by the broker 120, a lower level network address may be stored so long as this is sufficient to uniquely identify the destination for forwarding SOR messages within the requirements matching system.

The RPs stored in the RP store 215 essentially define the specialisms of other brokers 120 or of SSAPs 115 to receive SOR messages carrying requirements of particular types from that broker 120. The requirements matching and routing module 210 may attempt to match a received SOR with a requirement type recorded in the requirement specification field 325 of RPs stored in the RP store 215 by means of a comparison process. On finding a matching requirement specification (325), the requirements matching and routing module 210 controls the routing, via the network interface 200, of the received SOR message to the originator (305) of the matching RP. However, for an SOR message to be routed successfully to a particular destination, the matching and routing module 210 must find a matching requirement specification among registered RPs, stored in the RP store (215), to at least the level of detail specified in the requirement specification field 325 of the RP. If a requirement specification (325) contained in an RP is more specific and more detailed than the SOR type in the received message, then a match may not be found by direct comparison and the matching and routing module 210 may route the received SOR to a default destination within the requirements matching system, a general purpose broker 120 for example. But, having identified an intended destination for the SOR, the matching and routing module 210 may assemble an OMP message for transmission to the matching RP's originator (305), including the received message containing the SOR, and initiate a network connection via the network interface 200 to launch the SOR message, further enclosed within an HTTP or EMail message as appropriate.

The Routing Preference Registration & Update module 225 in the broker 120 of FIG. 2 may control the storage of RPs in the broker's store of registered SOR RPs 215. In particular, the RP registration & update module 225 may be arranged to implement a messaging scheme in common with other brokers 120 and with SSAPs 115 to enable requests to be received to register, amend or delete particular RPs in its own store 215, and to enable requests to be to sent to other brokers 120 to register, amend or delete RPs in their RP stores. By this messaging scheme, the broker may implant routing conditions throughout the requirements matching system to ensure that it receives only particular types of SOR message from other brokers. A description of a preferred messaging scheme related to RP registration and amendment will be presented later in this description.

Figure 6:
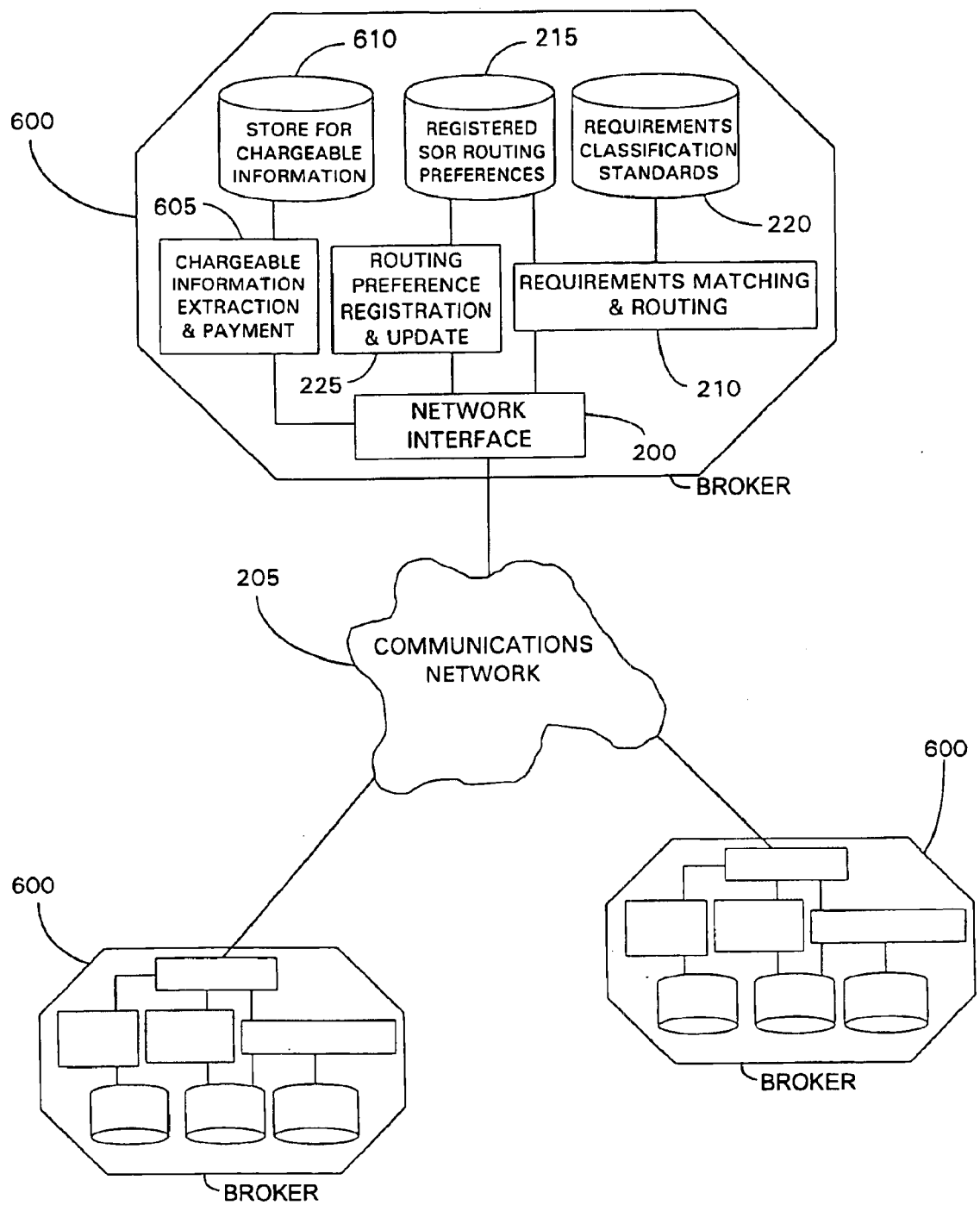
FIG. 6 is a diagram showing the main components of a requirements matching broker according to a second embodiment of the invention.

With reference to FIG. 6, a diagram is provided showing the main components of a broker 600 according to a second embodiment of the invention. The broker 600 may operate in an identical manner to that in the first embodiment described in overview above, but with the addition of a Chargeable Information Extraction & Payment module 605 and a store 610 for chargeable information extracted from received SOR messages. On receipt of an SOR message by the communications network interface 200, the Chargeable Information Extraction & Payment module 605 may extract predetermined types of valuable information contained in the received message and may store that information in the store 610. Valuable information may include, for example, details of the SOR message originator, required for a supplier (105) to be able to respond to a message. The remaining portion of the received message may then be forwarded by the matching and routing module 210 as described above, but without the extracted information. The forwarded message may include an indication of the type of information withheld by the broker 600 together with a price for purchase of that information. Extracted information may be subsequently forwarded to a particular supplier (105) by the broker 600 on request, but forwarding of such information may be linked to a known payment scheme. For example, a charge may be recorded by the broker 600 against a supplier account, maintained by the broker 600, or by a third party server, in respect of each request by the supplier (105) for valuable information. Alternatively, each request by the supplier (105) may be accompanied by an electronic payment to the forwarding broker 600 using a known electronic payment method.

Such an information extraction feature may be used as the basis for any one of a number of possible methods of funding the requirements matching system.

All references to a "broker 120" in the following sections may be taken to include a reference to equivalent functionality in a broker 600.

Typical Operational Configuration

Figure 4:
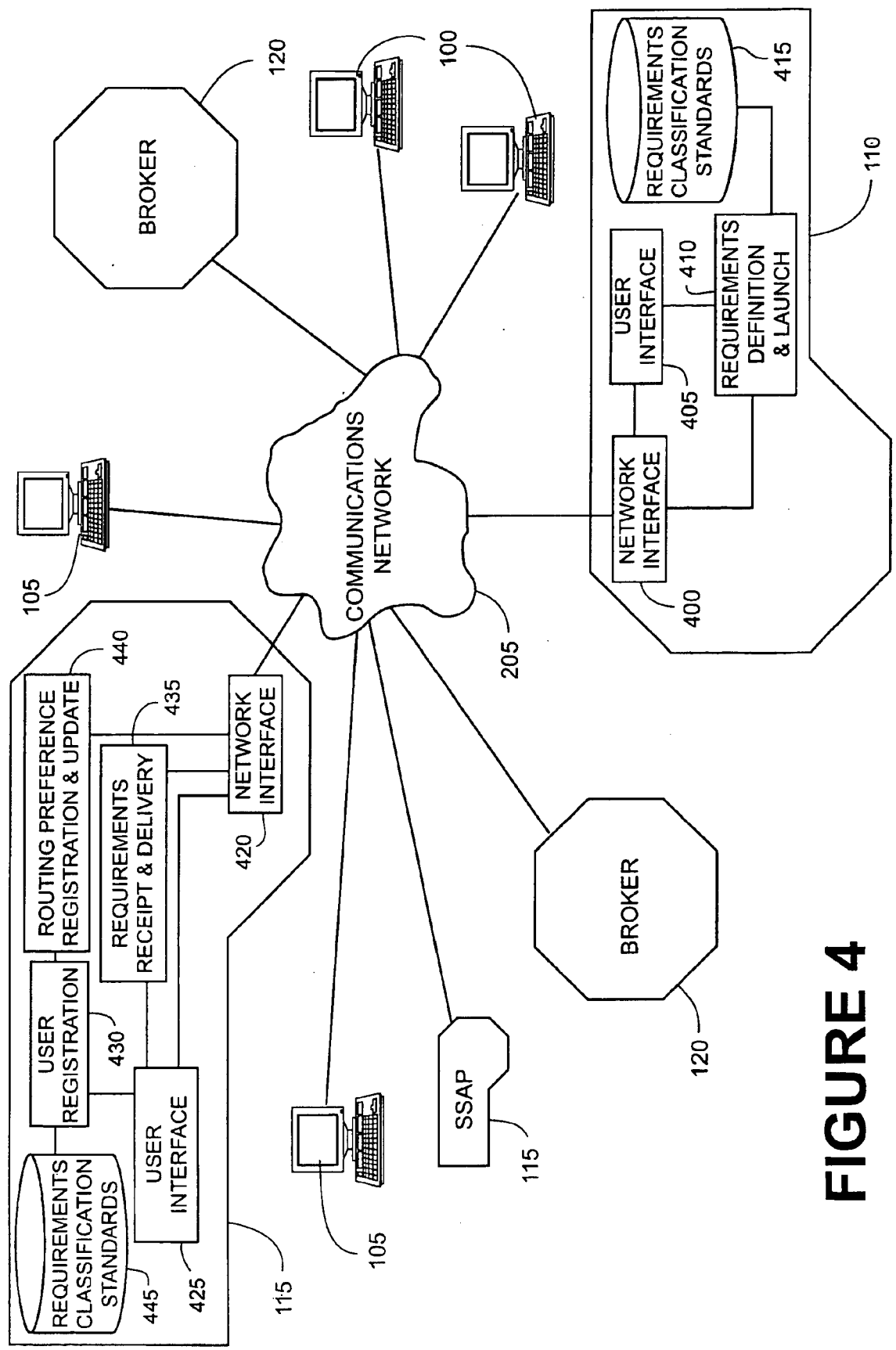
FIG. 4 is a diagram showing a typical operational requirements matching framework.

Referring to FIG. 4, a diagram depicting participants and users of a operational requirements matching framework is shown according to a preferred embodiment of the invention. The main components of a typical BSAP 110 and a typical SSAP 115 are shown together with "buyer" terminal equipment 100, "supplier" terminal equipment 105 and brokers 120, all linked to a common communications network 205. The BSAP 110 may include a network interface 400 with similar functionality to that included in a broker's network interface. In particular, the BSAP's network interface 400 may implement similar network protocols and may arrange with access to the communications network 205 to establish network connections for transfer of requirements messages created by users of the broker 110. The network interface 400 may also provide communications access to the BSAP 110 from user terminal equipment 100. The BSAP 110 may include a User Interface 405 to give user access to the facilities provided by the BSAP 110. In particular, a Requirements Definition & Launch module 410 may be provided to enable a user (100) to create an SOR conforming to predetermined standards using templates for example, via the user interface 400, and to launch an enclosing SOR message into the requirements matching system. The definition and launch module 410 may be arranged with access to a store of Requirements Classification Standards 415 to ensure that SORs created at the BSAP 110 conform to standards of requirement description, format and classification agreed throughout the requirements matching system. The standards store 415 may be held within the BSAP 110 as a local copy, or a remote standards store may be accessed by the BSAP 110 via the network interface 400 as required.

Preferably, a BSAP 110 may be configured to route all SOR messages created by its users to a particular broker 120, irrespective of the requirement type conveyed by an SOR message, so obviating the need for matching and routing functionality in the BSAP 110. The particular broker may be pre-selected on the basis of geographical location of the BSAP, availability of broker capacity or on any other criterion.

Referring to FIG. 4, the main components of typical SSAP 115 are shown to include a network interface 420 of a similar type to that used within brokers 120 and BSAPs 110, providing communications access to the SSAP 115, via the communications network 205, for user terminals 105 besides establishing network connections for exchanging messages with brokers 120. The SSAP 115 may include a proprietary user interface 425 to facilities offered by the SSAP 115. In particular, users (105) may register for access to the requirement matching system via the SSAP 115 using functionality provided by a proprietary User Registration module 430 via the user interface 425. The process of registration implemented by the user registration module 430 may enable a user to specify the types of SOR message that he/she prefers to receive via the SSAP 115 and to record those preferences within the SSAP 115. Preferably, users (105) may define their preferred SOR message types in terms of requirement types defined by the classification scheme in use throughout the requirements matching system. To this end the user registration module 430 may be arranged with access to a store of Requirements Classification Standards 445, either as a locally held copy or as a remote store accessible over the communications network 205 by means of the user interface 420.

The SSAP 115 may include a Routing Reference Registration & Update Module 440 arranged to implement the preferred messaging scheme of the requirements matching system for RP registration and update, defined later in this specification. In particular, the RP registration and update module 440 may generate messages to register RPs expressing the preferences of the SSAP's registered users and send those messages to one or more appropriate brokers 120. The user interface 425 may also provide access for users (105) to retrieve appropriate SOR messages delivered to the SSAP 115 by brokers 120.

The SSAP 115 may also include a proprietary Requirements Receipt & Delivery module 435 to receive SORs from brokers 120 via the network interface 420 and may include means to store the received SORs in the form accessible to registered users (105) via the user interface 425.

In practice, the supplier of a requirements matching system as described in overview above, may release an application programmer's interface (API) for the system to enable SAP suppliers to implement the system's message handling features, requirement classification scheme and, optionally, the system's requirements matching techniques. With latter available to a BSAP supplier, an alternative form of BSAP 110 may be provided including some requirements routing functionality, similar to that provided within brokers, for the storage of registered routing preferences and for the routing of requirements to particular brokers 120 according to those preferences. Such an arrangement has the advantage that the first stage of routing of an SOR, from creation at the BSAP 110, is directed to an appropriate, potentially specialist broker 120, rather than to a single predetermined broker 120 from which the most likely routing will be to another more relevant broker. A directed routing from BSAPs is likely to reduce the number of hops a message needs to take within the system of brokers before reaching an SSAP 115.

Preferably, each component of the electronic trading system may be linked to a communications network 205 such as that provided by the public Internet. Potential users of the system may be equipped with personal computers (100, 105) having a suitable Internet interface and Internet connection and running a known Internet browser product. BSAPs 110 and SSAPs 115 may be implemented using known computers in the role of servers equipped with a standard interface to the communications network 205 (e.g. the Internet) and running software implementing network level protocols and any higher level protocols employed for requirements matching & routing using software released as part of the system API. Functionality of BSAPs 110 and SSAPs 115 may be implemented and controlled using computer programs running on the respective server computers and written using known computer programming languages such as C and C++. Those elements of BSAP and SSAP functionality involving an interaction with the requirements matching system of brokers may be implemented using software provided as part of the system API. However, beyond those aspects required for interaction with the network 205 and with brokers 120, the functionality offered by a SAP to users may vary according to the SAP proprietor.

Brokers 120, similarly, may be implemented using known servers linked to the communications network 205 using a common standard interface and implementing agreed protocols and message structures. Functionality of brokers may be implemented and controlled using computer programs written using known computer programming languages such as C and C++. RP stores 215 and requirements classification standards stores 220 may be implemented using a known database management system such as that provided by ORACLE Inc. If appropriate, a broker server may serve as a computing platform to more than one logically different broker. The functionality of a requirements broker may be implemented as computer programs written using C or C++ for example, running on a processor within the broker server computer.

Use of the Operational Configuration

With reference to FIGS. 2, 3 and 4, use of a requirements matching system will now be described in more detail in the context of an electronic trading system, according to a preferred embodiment. However, the requirements matching system may also be used in a similar way to that described below, in the context of other applications. In particular, "suppliers" may be simply sources of information rather than commercial traders in products or services. Suppliers of information may capture specific requests for information, sent by "buyers", by means of registered RPs in the same way as suppliers in the scenario now to be described.

A preferred electronic trading system enables a buyer to issue, from terminal equipment 100, a request to suppliers, for receipt at terminal equipment 105, to tender for supply of a product or service of the buyer's specific description. To ensure that all suppliers have an equal chance of being able to respond to a buyer's requirements, the trading system may be arranged to target delivery of SOR messages to any supplier (105) with a registered interest in receiving requests relating to a particular type of product or service. As described above, "targeted delivery" may be achieved using a system of requirements brokers 120 arranged to route SOR messages from a BSAP 110 to one or more SSAPs 115 according to registered RPs (215).

Preferably, SSAPs 115 may specialise in particular types of product or service. That is, suppliers (105) of particular products or services may arrange for access to the trading system through an SSAP 115 known to specialise in the trade of similar products or services. For example, an SSAP 115 participating in the trading system may specialise in supplying motor cars. Car suppliers may arrange to gain access to such an SSAP 115 from terminal equipment 105 for the receipt of SORs from the trading system either for motor cars in general or for cars of a specific description. Access by a supplier (105) to an SSAP 115 may be provided by the SSAP 115 supplier under the terms of a commercial agreement. Preferably, the specialism of a particular supplier gaining access through the SSAP 115 may be expressed in terms of product or services types already defined within the trading system's agreed classification scheme (220).

In practice, brokers 120 within the trading system may specialise in receiving SOR messages relating to particular types of product or service. The specialisms of brokers may be determined by the provider of the trading system and may be advertised among participants in the trading system either automatically through a messaging scheme or by manual means. An administrator associated with an SSAP 115 may, through functionality provided by the SSAP's Routing Preference Registration & Update module 440, create an appropriate message and send it to a broker advertised as specialising in a relevant type of product or service to store an RP expressing a particular supplier's preference. Thereafter, if that broker 120 receives an SOR message specifying a requirement matching that in the supplier's registered RP, then the broker will forward the SOR message to the SSAP 115 for delivery to the supplier.

As will be described later, a messaging scheme may include a message to obtain details of RPs stored by any particular broker within the requirements matching system. Using such a message, SSAPs 115 may automatically deduce the specialisms of brokers 120 and may use that information to automatically select appropriate brokers with which to store RPs appropriate to their suppliers' preferences.

In a trading system handling a large range of different products or services, brokers 120 may specialise in receipt and routing of SORs relating to higher level categories of product or service that those of SSAPs 115. For example, whereas an SSAP 115 may specialise in supplying motor cars, a broker 120 may specialise in routing all SORs related to motor vehicles in general. To ensure that it receives all motor vehicle SORs, the motor vehicle broker 120 may arrange to register, in the routing preference stores 215 of other brokers 120 likely to receive such SORs, a routing preference to receive all "Vehicle" SOR messages. By application of this mechanism, all broker specialisms may be registered and understood throughout the trading system. At the SSAP 115 level, having identified that there is a broker 120 within the system specialising in motor vehicles, any SSAP 115 specialising in supplying motor cars may arrange to register appropriate RPs (215) with the motor vehicle broker 120 to receive any SOR relating to motor cars in particular. Messages to register RPs among brokers 120 of a trading system, as between SSAPs 115 and brokers 120, may be initiated by an administrator using functionality provided by RP registration and update modules 225 within respective brokers.

Preferably, a participating BSAP 110 may send all SORs generated by its buyers (100) to a particular nominated broker 120, irrespective of requirement type. The nominated broker 120 may provide an initial point of contact within the trading system to all buyers (100) using the BSAP 110, within a particular geographic area for example. Analysis of requirement type and subsequent routing of SORs may then take place only within brokers 120, rather than implement such functionality within BSAPs 110.

The use of brokers 120, and specialist brokers in particular, brings advantages over alternative requirements matching and routing systems and electronic trading systems. For example, in a system comprised only of SSAPs 115 and BSAPs 110, or their equivalent, interconnected by means of a communications network 205, any preference by an SSAP 115 to receive a particular type of SOR may need to be somehow embodied within every BSAP 110. Every SSAP 115 would need to maintain information about every BSAP 110 to ensure that its interests are registered at each source of SORs. This is because any buyer (100) may choose to buy any available type of product or service and so any BSAP 110 may potentially introduce an SOR of any valid type into the system. However, as in the present invention, a trading system incorporating a relatively small number of brokers 120 to route requirements from BSAPs 110 to SSAPs 115 would be able to operate using a greatly simplified system of registration of interests. An SSAP 115 need only be aware of the broker or brokers 120 specialising in relevant categories of product or service and ensure that its interests are registered as RPs (215) with that or those brokers only. As regards the brokers 120 themselves, each broker 120 needs to register its particular interests as RPs (215) with some or all of the other brokers. If a broker 120 is arranged to specialise in higher levels of requirements category than those of SSAPs 115, then the total number of routing preferences registered in the system may be much reduced and the registrations may be further simplified. However, the requirements matching and routing modules 210 would need to embody more sophisticated SOR matching algorithms to ensure correct routing of SORs expressed more specifically than the level registered as a routing preference (215).

In the absence of brokers 120, an alternative to the registration of SSAP routing preferences at every BSAP 110 would be for every SSAP 115 to individually monitor every requirements message broadcast onto the communications network 205 by BSAPs 110 and to analyse and select those messages of interest to their users (205). However, for any but a very small system, the volume of data to be analysed by SSAPs 115 may be prohibitive.

Requirements Definition and Classification

To enable brokers 120 to route SORs within a requirements matching system, it is important that a common scheme of requirements classification and notation be agreed and implemented throughout the system. To ensure successful matching and routing of SORs, the classification scheme may be agreed to at least the lowest level of requirement detail at which requirements routing is to be defined within the system. Preferably, the requirement matching system API may include an interface to a predefined requirements classification scheme store, implemented by the system brokers, for use by SAP suppliers to ensure consistency and compliance. There follows a description of a preferred scheme for requirements classification and specification, although other known classification schemes may be adopted for use in applications of the invention as appropriate.

Any requirement may be specified in terms of "resources" and "attributes" of those resources. A "resource" may be anything, from an everyday object to a service, appropriate to the application of the invention being considered. In a trading system a "resource" may be any product or service or any feature of a product or service of potential interest to buyers. An object oriented approach may be adopted for the definition and classification of resources and attributes of resources likely to be specified by users in SORs. For example, a resource such as a "car" may be specified as an "object" in the object-oriented sense. Features—"attributes"—of the car resource may include engine size, body colour, presence of air conditioning, etc. All the attributes that may be used to specify a "CAR" object may be defined within the classification system. The definition of the "CAR" object may also include other objects with their own set of valid attributes. A particular "Car" object may then be specified in terms of a particular selection of valid car attributes (features). Conveniently, a known text-based mark-up language may be applied to the representation of object and attribute definitions, the "Extensible Markup Language" (XML) for example, as defined and published by the World Wide Web Consortium on the Internet at http://www.w3.org/TR.

Within a requirements matching system, all applicable resources may be predefined in terms of objects and their attributes, at least to the level of detail required for routing through the system. Each object definition agreed for use within the system may be stored in a reference store of Requirements Classification Standards. Preferably, as described above, the store of Requirements Classification Standards may be accessible by BSAPs 110 and brokers 120 either remotely or locally. A local copy 415 may be held within the BSAP 110 for use by users (100) in creating SORs and a copy 220 may be held within a broker 120 to assist with requirements validation and routing.

Considering a preferred embodiment of the invention applied to an electronic trading system, all objects used within the system may be referred to, for the purpose of this description, as "Global Trader" or "GT" Objects. Various elements of a requirements definition language may be devised to describe and classify GT objects and their attributes using the XML notation. For example, for the purpose of requirements routing, a classification of object type is likely to be particularly important. For this, a tag such as <GT_OBJECT_TYPE> may be recognised throughout the system as the language element declaring object type. For example, in XML notation, a "VEHICLE" object type may be represented as:

```
<GT_OBJECT_TYPE id="VEHICLE">
    <GT_DESCRIPTION>text description</GT_DESCRIPTION>
</GT_OBJECT_TYPE>
``` where <GT_DESCRIPTION> is a tag enclosing a short "text description" of the "VEHICLE" object.

A hierarchy of object types may be defined using a <GT_OBJECT_PARENT> tag within <GT_OBJECT_TYPE>. For example, a "CAR" object may be defined, within the "CAR" object type definition, as having "VEHICLE" as its parent object. That is,

```
<GT_OBJECT_TYPE id="CAR">
    <GT_DESCRIPTION>text description</GT_DESCRIPTION>
    <GT_OBJECT_PARENT id="VEHICLE"/>
</GT_OBJECT_TYPE>
```

Similarly, for a "BUS",

```
<GT_OBJECT_TYPE id="BUS">
    <GT_DESCRIPTION>text description</GT_DESCRIPTION>
    <GT_OBJECT_PARENT id="VEHICLE"/>
</GT_OBJECT_TYPE>
```

Attributes that may be used with an object, or with another attribute, may be defined using a <GT_ATTRIBUTE_TYPE> tag, including within it a range of valid attribute values each enclosed by a <GT_ATTRIBUTE_VALUE> tag. For example, a "COLOUR" attribute type may be defined as:

```
<GT_ATTRIBUTE_TYPE id="COLOUR">
    <GT_DESCRIPTION>text description</GT_DESCRIPTION>
    <GT_ATTRIBUTE_VALUE id="WHITE">
        <GT_ATTRIBUTE_VALUE id="ROSE_WHITE"/>
        <GT_ATTRIBUTE_VALUE id="TRANQUILITY"/>
        <GT_ATTRIBUTE_VALUE id="SUNRISE"/>
    </GT_ATTRIBUTE_VALUE>
    <GT_ATTRIBUTE_VALUE id="RED"/>
    <GT_ATTRIBUTE_VALUE id="BLUE"/>
</GT_ATTRIBUTE_TYPE>
```

Note that, in this example, that three further distinguishing attribute values may be specified for the colour attribute value "WHITE".

Other attributes applicable to cars may be defined, including for example:

```
<GT_ATTRIBUTE_TYPE id="MAKE">
    <GT_DESCRIPTION>text description</GT_DESCRIPTION>
</GT_ATTRIBUTE_TYPE>

<GT_ATTRIBUTE_TYPE id="FUEL_ECONOMY">
    <GT_DESCRIPTION>text description</GT_DESCRIPTION>
    <GT_UNIT_SET id="FUEL_ECONOMY"/>
</GT_ATTRIBUTE_TYPE>

<GT_ATTRIBUTE_TYPE id="LENGTH">
    <GT_DESCRIPTION>text description</GT_DESCRIPTION>
    <GT_UNIT_SET id="DISTANCE"/>
</GT_ATTRIBUTE_TYPE>
```

"Unit sets" may be defined by a <GT_UNIT_SET> tag, with the 'id' parameter disclosing the unit set name. Within this tag may be enclosed a set of <GT_UNIT> tags specifying each unit in the range of allowable units. Each unit may declare an appropriate conversion factor to convert to the reference unit specified by <GT_REFERENCE_UNIT>. For example:

```
<GT_UNIT_SET id="FUEL_ECONOMY">
    <GT_REFERENCE_UNIT id="MPG">
    <GT_UNIT id="MPUG" conv_factor="1.2">
    <GT_UNIT id="MPL" conv_factor="0.5">
</GT_UNIT_SET>

<GT_UNIT_SET id="DISTANCE">
    <GT_REFERENCE_UNIT id="METERS">
    <GT_UNIT id="MILLIMETERS" conv_factor="0.001">
    <GT_UNIT id="KILOMETERS" conv_factor="1000">
    <GT_UNIT id="MILES" conv_factor="1600">
</GT_UNIT_SET>
```

In specifying requirements to be broadcast within an SOR, a user (100) may select valid object and attribute type definitions from the store of requirements classification standards 415. For example, a user (100) wishing to buy a car may specify a car object in their SOR having particular attributes selected from those applicable to an object of that type. A user (100) may specify a car object using XML notation as follows:

```
<GT_OBJECT id="CAR">
    <GT_ATT id="MANUFACTURER">Ford</>
    <GT_ATT id="MODEL">Mondeo</>
    <GT_OBJECT id="ENGINE">
        <GT_ATT id="MODEL">FR54HR</>
        <GT_ATT id="FUEL">Petrol</>
        <GT_ATT id="ENGINE_CAPACITY" units="CC">1800</>
        <GT_ATT id="NUM_VALVES">16</>
        <GT_ATT id="MAX_RPM" units="RPM">6000</>
        <GT_ATT id="ENGINE_POWER" units="BHP">150</>
    </GT_OBJECT>
    <GT_ATT id="FUEL_ECONOMY" units="MPG">40</>
    <GT_ATT id="COLOUR">RED</>
    <GT_ATT id="AIR_CONDITIONING" opp="-">*</>
    <GT_ATT id="SUNROOF">*</>
</GT_OBJECT>
```

In this example, the <GT_OBJECT> tag specifies a selected object, in this case "CAR", from the previously declared valid object types, while <GT_ATT> specifies attributes of the car object selected from previously declared attribute types and specifies particular values for each type of attribute. Further notation devices used in the above example include the "*" to denote that any valid attribute value applies in respect of that attribute type, e.g. the car may have any type of "SUNROOF", and the "opp" parameter to denote that a particular attribute value is specifically not required. In this example, opp="-" is used in combination with the "*" to indicate that none of the valid "AIR_CONDITIONING" attribute values are to be included in the specified "CAR" object, i.e. air conditioning is not required in the specified car in any form.

In a trading system, the store of Requirements Classification Standards 220 and 415, accessed by brokers 120 and BSAPs 110 respectively, may contain object type definitions such as those for "VEHICLE", "CAR" and "BUS" shown above. Conveniently, a broker 120 may specialise in receiving SORs relating to the object type "VEHICLE", whereas SSAPs 115 may specialise in lower level object types such as "CAR" or "BUS". Given the above definition of the "VEHICLE" object type, routing preferences (215) may be recorded at brokers 120 to route all SORs relating to cars, for example, to the "Vehicle" broker. Alternatively, routing preferences may be expressed at the level of the intended recipient's specialism, leaving the requirements matching and routing modules 210 to deduce the associated parent object, and hence the appropriate broker, from the object type definitions stored in the requirements classification standards store 220, 415. In this example, an algorithm may be implemented within a requirements matching module 210 to deduce from the "CAR" object type definition that an SOR relating to a car may be routed to a broker specialising in "VEHICLE"-related SORs if no broker specialised at the "CAR" level. Further, an SSAP 115 having registered users in the business of supplying cars may be arranged to recognise from the standard "VEHICLE" object type definition that a broker 120 specialising in "Vehicle" SORs may be receiving SORs relating to cars, amongst other SORs falling within the "VEHICLE" object hierarchy. That SSAP 115, or an administrator thereof, may therefore arrange for a routing preference (215) to be registered with the "Vehicle" broker to ensure that the broker forwards any car-related SORs to that SSAP 115. Another SSAP 115 may register a similar or more specialised requirement routing preference (215) with the "Vehicle" broker, appropriate to the preferences of its users (105).

Preferably, routing of SORs may take place using any appropriate level of object type definition or attribute type definition identifiable within an SOR, provided that those definitions are agreed sufficiently widely within the requirements matching system to enable routing to take place consistently. A facility to define specialisms at any valid level may be particularly important where, for example, two brokers are specialising in Vehicles, but one is specialising only in Cars while the other is specialising in all the remaining vehicle types. At a lower level still, if an SSAP 115 were to specialise in supplying only red cars, then the routing preferences (215) registered by that SSAP 115 with the broker(s) specialising in Vehicles may be specified down to the attribute value level, that is to "RED". Some particularly specialised suppliers (105) may need to register highly detailed routing preferences via their SSAP 115 to avoid receiving SORs that they could not possibly satisfy.

Open Messaging Protocol (OMP)

The Open Messaging Protocol (OMP) referred to above may include a number of features of use, but not essential, to the working of a requirements matching system. In particular, an OMP identifier, each one unique within the requirements matching system, may be allocated to each node participating in or linked to the system, that is, to each broker 120, BSAP 110 and SSAP 115. An OMP implementation may include means to maintain a translation table to convert OMP identifier to the underlying network address—Internet domain name or IP address in the case of the Internet. This has the advantage that a more stable and descriptive identification system may be used within the OMP than may be possible with changing IP addresses or domain names. Ideally, a third party may control the allocation of OMP identifiers and maintenance of translation tables. Of course, the system may operate using only Internet domain names or IP addresses, for example, but these are subject to change. Any changes would need to be made, less conveniently, to respective entries in routing preference stores 215 in the absence of an OMP.

An OMP message may be text based and may use XML notation to declare message parameters within a predefined hierarchy and message structure. Preferably, an OMP message may have two parts—information that is common to many messages (such as node identifier and routing information) and information specific to a particular message, such as an SOR to be transmitted to a particular broker. Common information may be held as a Common Message Block (CMB) within the OMP message, separated from Message-specific Content (MSC) by appropriate XML tags, as follows:

<?XML VERSION="1.0"?>
<idoctype OMP system "omp.dtd">
<OMP version="1.0">
  <CMB>
    Common Message Block Information
  </CMB>
  <MSC encoding="base64">
    Message Specific Content
  </MSC>
</OMP>

The CMB part of the message may be enclosed by <CMB> tags while the MSC part of the OMP message may enclosed within <MSC> tags. The MSC part may be encoded as base64 for example, although other codings may be used as necessary, considering the type of lower level protocol to be used to convey OMP messages across the communications system to the next node. For example, if EMail is to be used to convey a requirements-related message to the next broker 120, then the whole of the corresponding OMP message may be encoded as base64.

In a particular embodiment of the system implementing an OMP protocol layer, the CMB part of an OMP message may be used to identify the source of a message and, if known, the identity of the next stage in the communications path for the message. As the OMP message traverses from node to node within the system, to specified destination within the message or according to requirements routing preferences 215 stored at each node, an OMP implementation running at each participating node may add its own OMP node identity to the CMB part of the message together with a date and time entry for receipt and transmission of the message. An audit trail may thus be accumulated within the OMP message, of potential use to an eventual recipient of the message (e.g. an SSAP 115) when selecting a return communications path for response to an SOR contained in the message. An example of an OMP message Common Message Block (CMB), expressed in XML notation, is as follows:

<CMB>
  <ROUTING MsgID="OMP-M-GUID">
    <MESS-SUPPLIER id="O-GUID"/>
    <MESS-CONSUMER id="C-GUID"/>
    <MESS-PATH>
      <NODE guid="N-GUID-1"/>
      <NODE guid="N-GUID-2"/>
      <NODE guid="N-GUID-3"/>
    </MESS-PATH>
  </ROUTING>
  <AUDIT>
    <TRAIL>

```
<NODE guid="N-GUID-1" return="yes">
    <SENT date="19970906" time="175022"/>
</NODE>
<NODE guid="N-GUID-2" return="no">
    <RECEIVED data="19970906" time=
      "180543"/>
    <SENT date="19970906" time="185045"/>
</NODE>
<NODE guid="N-GUID-3" return="yes">
    <RECEIVED date="19970906" time=
      "191036"/>
</NODE>
</TRAIL>
</AUDIT>
</CMB>
```

In this example, <ROUTING> defines a unique OMP message identifier "OMP-M-GUID" allocated by the originating node. <MESS_SUPPLIER> declares the OMP identifier of the source node (BSAP) of the message (SOR). >MESS_CONSUMER> may declare the OMP identifier of the eventual message recipient, if known, or the next stage in the transmission path, if known. If <MESS_CONSUMER> is left blank, then the routing may be directed according to requirements routing preferences 215 recorded at the present node. The <MESS_PATH> tags enclose a path through the system, initially unspecified, to which each <NODE> handling the message may add its own OMP identifier as the message passes through. The <AUDIT> and <TRAIL> tags enable date and time information to be added by each participating node in the network path as the message is received and forwarded, providing an audit trail of message handling by the system.

An OMP implementation deployed at each node within the system may interact with lower level protocols appropriate to the communications network 205 being used. An OMP may advantageously interact with any one of a number of different protocols to achieve routing of messages without need to alter the implementation of the requirements matching functionality deployed at each participating node. For example, HTTP may be used to transfer messages between some brokers 120 whereas EMail or CORBA may be appropriate in other cases. The OMP may provide a common interface between the requirements matching system and any one of thee lower level protocols, maintaining a common scheme for node identification and of OMP message structure.

SOR Structure and SOR Messages

Preferably a BSAP 110 may provide a requirements definition and launch module 410, incorporating functionality provided or defined by the requirements matching system API, to enable users (100) to create and broadcast an SOR comprising a requirement specification, such as that shown above for the example of a car, and some further parameters including the source and period of validity of the SOR.

Each of the parameters of an SOR message may be defined and represented using XML notation in terms of pre-defined objects and their attributes. Those object and attribute definitions may be stored in a reference store accessible to every broker 120 participating in the requirements matching system and to BSAPs 110 through functionality provided with the system's API. SOR parameter definitions may be included in the requirements classification standards store 220, 415 for example. The following element definitions may be used to specify SOR-related objects and attributes:

| Element | SOR⁻ |
|---|---|
| Attributes | id = "text" |
| Parents | Depends upon the message enclosing the SOR |
| Children | EXPIRY, LAST_REAFFIRMED, ORIGINATOR, SOR_SPECIFICATION |
| Comments | The id attribute uniquely identifies this SOR within the system |
| Element | EXPIRY |
| Attributes | Date = "text" |
| Parents | SOR |
| Children | none |
| Comments | Specifies SOR expiry date with Date attribute. The date format should comply with International Standards Organisation (ISO) recommendations |
| Element | LAST_REAFFIRMED |
| Attributes | Date = "text" |
| Parents | SOR |
| Children | none |
| Comments | The Date parameter specifies the date the SOR was last reaffirmed. The date format should comply with IOS recommendations |
| Element | ORIGINATOR |
| Attributes | DetailsStatus = "text" |
| Parents | SOR |
| Children | BROKER, GT_OBJECT |
| Comments | Specifies the SOR originator. The DetailsState parameter must be one of 'ODAv'—Originator Details Available, 'ODInc'—Originator Details Included, or 'OAn'—Originator Anonymous |
| Element | BROKER |
| Attributes | guid = "text" |
| Parents | ORIGINATOR |
| Children | none |
| Comments | The guid attribute specifies the globally unique ID of the BSAP or Broker that originated the SOR |
| Element | SOR_SPECIFICATION |
| Attributes | application = "text" |
| Parents | SOR |
| Children | GT_OBJECT |
| Comments | Specifies the SOR. The application attribute states the type of application that created the SOR |
| Element | GT_OBJECT |
| Attributes | id = "text" |
| Parents | ORIGINATOR, SOR_SPECIFICATION, GT_OBJECT |
| Children | GT_OBJECT, GT_ATT |
| Comments | Delimits a resource definition object. The object type is specified using the id attribute, e.g. "CAR", "GT_USER" |
| Element | GT_ATT |
| Attributes | id = "text", units = "text" |
| Parents | GT_OBJECT |
| Children | none |
| Comments | Delimits a resource definition attribute. The attribute type is specified using the 'id' parameter, and any units used with the 'units' parameter |

Element 'parents' and 'children' define the object hierarchy to be used within an SOR. Preferably, the SOR 'id' may be allocated by the BSAP 110 or broker 120 where the SOR was created. The 'ORIGINATOR' of an SOR may be defined in terms of the originating BSAP or broker and in terms of other objects used to define details of the originating user (100). The identity of the originating BSAP or broker may be specified using the 'BROKER' object by means of a unique identifier attribute 'guid'. Broker and BSAP identifiers allocated for use within the OMP, discussed earlier, may be used here. The objects and attributes defined for specifying personal details of the individual user (100) who created the SOR may include address and other contact information as appropriate.

Availability of SOR originator details may be controlled by brokers 120 by means of the 'DetailsStatus' attribute of the 'ORIGINATOR' object. That is, a broker may withhold originator details from a supplier (105), indicating within the SOR by means of the 'DetltaState' attribute that originator details are available. A known payment system may be implemented within the requirements matching system wherein suppliers (105) may pay to receive originator details in respect of selected SORs, if available. Preferably, ongoing provision and administration of a electronic trading system may be funded by suppliers through such a payment system, a micro-payment system operating over the Internet for example. Further details of message types relating to the request and supply of SOR originator details will be described later in this specification.

The 'SOR_SPECIFICATION' may be defined in terms of objects and their attributes as discussed earlier in relation to requirements definition. This element encloses the expression of a user's (100) detailed requirements in terms of predefined object and attribute types according to the agreed classification system, an example being the "CAR" object defined earlier. The 'SOR_SPECIFICATION' element includes an 'application' attribute to enable the use of the SOR specification to be distinguished between that for "broadcasting" an SOR by a user (100) and that in registering a requirements specification as part of a routing preference (215) at a broker 120.

By way of example, a full SOR for use as a broadcast of a buyer's requirements, for example, is shown as follows, including the car object specified above as the user's requirements enclosed within <SOR_SPECIFICATION> tags:

```
<SOR id="017_12171">
  <EXPIRY date="19970906"/>
  <LAST_REAFFIRMED date="19970801"/>
  <ORIGINATOR DetailsState="ODAv">
    <BROKER guid="BS_017"/>
    <GT_OBJECT id="GT_USER">
      <GT_ATT id="GT_USER_ID">a.miles</>
      <GT_ATT id="NAME">Andrew Miles</>
      <GT_ATT id="FAMILIAR_NAME">Andy</>
      <GT_ATT id="SEX">MALE</>
      <GT_ATT id="AGE">28</>
      <GT_OBJECT id="GPS_LOCATION">
        <GT_ATT id="LONGITUDE">54n</>
        <GT_ATT id="LATITUDE">67e</>
      </GT_OBJECT>
    </GT_OBJECT>
    <GT_OBJECT id="CONTACT_DETAILS>
      <GT_ATT id="PRICE" units="ENGLISH_PENCE">20</>
    </GT_OBJECT>
  </ORIGINATOR>
  <SOR_SPECIFICATION application="GT_TENDERING">
    <GT_OBJECT id="CAR">
      <GT_ATT id="MANUFACTURER">Ford</>
      <GT_ATT id="MODEL">Mondeo</>
      <GT_OBJECT id="ENGINE">
        <GT_Att id="MODEL">FR54HR</>
        <GT_ATT id="FUEL">Petrol</>
        <GT_ATT id="ENGINE_CAPACITY" units="CC">1800</>
        <GT_ATT id="NUM_VALVES">16</>
        <GT_ATT id="MAX_RPM" units="RPM">6000</>
        <GT_ATT id="ENGINE_POWER" units="BHP"22 150</>
      </GT_OBJECT>
      <GT_ATT id="FUEL_ECONOMY" units="MPEG">40</>
      <GT_ATT id="COLOUR">RED</>
    </GT_OBJECT>
  </SOR_SPECIFICATION>
</SOR>
```

Having created an SOR at a BASP 110, according to the structure defined above, the user (100) may arrange to broadcast the SOR within an appropriate message over the communications system 205. The message type enclosing the SOR may be defined using a further message element "GT_MESSAGE", defined as follows:

| | |
|---|---|
| Element | GT_MESSAGE |
| Attributes | Type = "text", msg_id = "text" |
| Parents | None |
| Children | RP, ORIGINATOR, SOR, EXPIRY, GT_APPLICATION_DATA, TIME, DATE, ERROR. |
| Comments | Defines message type and the bounds for message data. The type parameter states the message type and the msg_id parameter a globally unique id for the message. |

The 'GT_MESSAGE' element enables the type of message to be defined and specifies a unique identifier to be allocated to the message by the originating node, typically a BSAP 110. The message identifier allocated is intended to remain unchanged as the message is converted through the requirements matching system. Message identifiers allocated at the level above a "GT_MESSAGE", by the OMP for example, may be separately allocated (e.g. by the OMP implementation) at each node involved in routing the message through the system.

Preferably, as discussed earlier, several protocol layers may be involved in transporting an SOR message between participating nodes within a requirements matching system. For example, at an originating BSAP 110, at the requirements matching system (trading system) layer, the requirements definition and launch module 410 may include an OMP implementation to encode an SOR for inclusion within the MSC portion of an OMP message, nominating a broker 120 selected to receive SORs from this BSAP 110 as the <MESS_CONSUMER> in the CMB part of the OMP message. The definition and launch module 410 or the BSAP's network interface 400, as appropriate, may further enclose the OMP message within an HTTP or EMail message to transport the SOR over the communications network 205, the Internet for example, to the nominated broker 120. A translation of the target broker's OMP identifier to the corresponding Internet domain name or IP address may be performed at an interface between the OMP and HTTP/EMail implementations within the BSAP 110, preferably with access to a third party-maintained translation table residing on an appropriate network server, a Domain Name Server (DNS) for example. Similar processes may operate at forwarding brokers, although while the OMP implementation may be consistent across the requirements matching system, different transport level protocols may be used to transfer messages between different pairs of nodes within the system if required.

On arrival at the nominated broker 120, the SOR message may be received by the broker's network interface 200 and "unwrapped" from its EMail or HTTP message and, if necessary, decoded. The network interface 200 and/or the broker's requirements matching and routing module 210 may then extract the 'GT_MESSAGE' and the "SOR" from an enclosing OMP message. The matching and routing module 210 may then perform its matching and routing functions, as described in detail in the next section. On identifying a destination for forwarding the "SOR", the broker may perform a similar train of operations as described above in respect of the originating BSAP 110, to enclose the SOR in OMP and lower level message formats ready for transport across the communications network to the next nominated destination.

By way of example, the MSC portion of an OMP message generated from a broker 120 in response to a match against a routing preference of the above SOR, before encoding, is as follows:

```
<GT_MESSAGE type="Broadcast" msg_id="GUID">
   <RP id="B4R134"/>
   <RP id="B7R71"/>
   <SOR id="017_12171">
      <EXPIRY date="19970906"/>
      <LAST_REAFFIRMED date="19970801"/>
      <ORIGINATOR DetailsState="ODAv">
         <BROKER guid="BS_017"/>
         <GT_OBJECT id="GT_USER">
            <GT_ATT id="GT_USER_ID">a.miles</>
            <GT_ATT id="NAME">Andrew Miles</>
            <GT_ATT id="FAMILIAR_NAME">Andy</>
            <GT_ATT id="SEX">MALE</>
            <GT_ATT id="AGE">28</>
            <GT_OBJECT id="GPS_LOCATION">
               <GT_ATT id="LONGITUDE">54n</>
               <GT_ATT id="LATITUDE">67e</>
            </GT_OBJECT>
         </GT_OBJECT>
         <GT_OBJECT id="CONTACT_DETAILS>
            <GT_ATT id="PRICE" units="ENGLISH_PENCE">20</>
         </GT_OBJECT>
      </ORIGINATOR>
      <SOR_SPECIFICATION application="GT_TENDERING">
         <GT_OBJECT id="CAR">
            <GT_ATT id="MANUFACTURER">Ford</>
            <GT_ATT id="MODEL">Mondeo</>
            <GT_OBJECT id="ENGINE">
               <GT_ATT id="MODEL">FR54HR</>
               <GT_ATT id="FUEL">Petrol</>
               <GT_ATT id="ENGINE_CAPACITY" units="CC">1800</>
               <GT_ATT id="NUM_VALVES">16</>
               <GT_ATT id="MAX_RPM">6000</>
               <GT_ATT id="ENGINE_POWER" units="BHP">150</>
            </GT_OBJECT>
            <GT_ATT id="FUEL_ECONOMY" units="MPG">40</>
            <GT_ATT id="COLOUR">RED</>
         </GT_OBJECT>
      </SOR_SPECIFICATION>
   </SOR>
</GT_MESSAGE>
```

In this example, two RP identifiers are listed as having defined the path of the message through the system.

Detailed Description by Key Broker Components

Having defined a preferred environment of message protocol and message notation, a more detailed description will now be provided for the RM&R module 210 of a broker 120.

Figure 5:
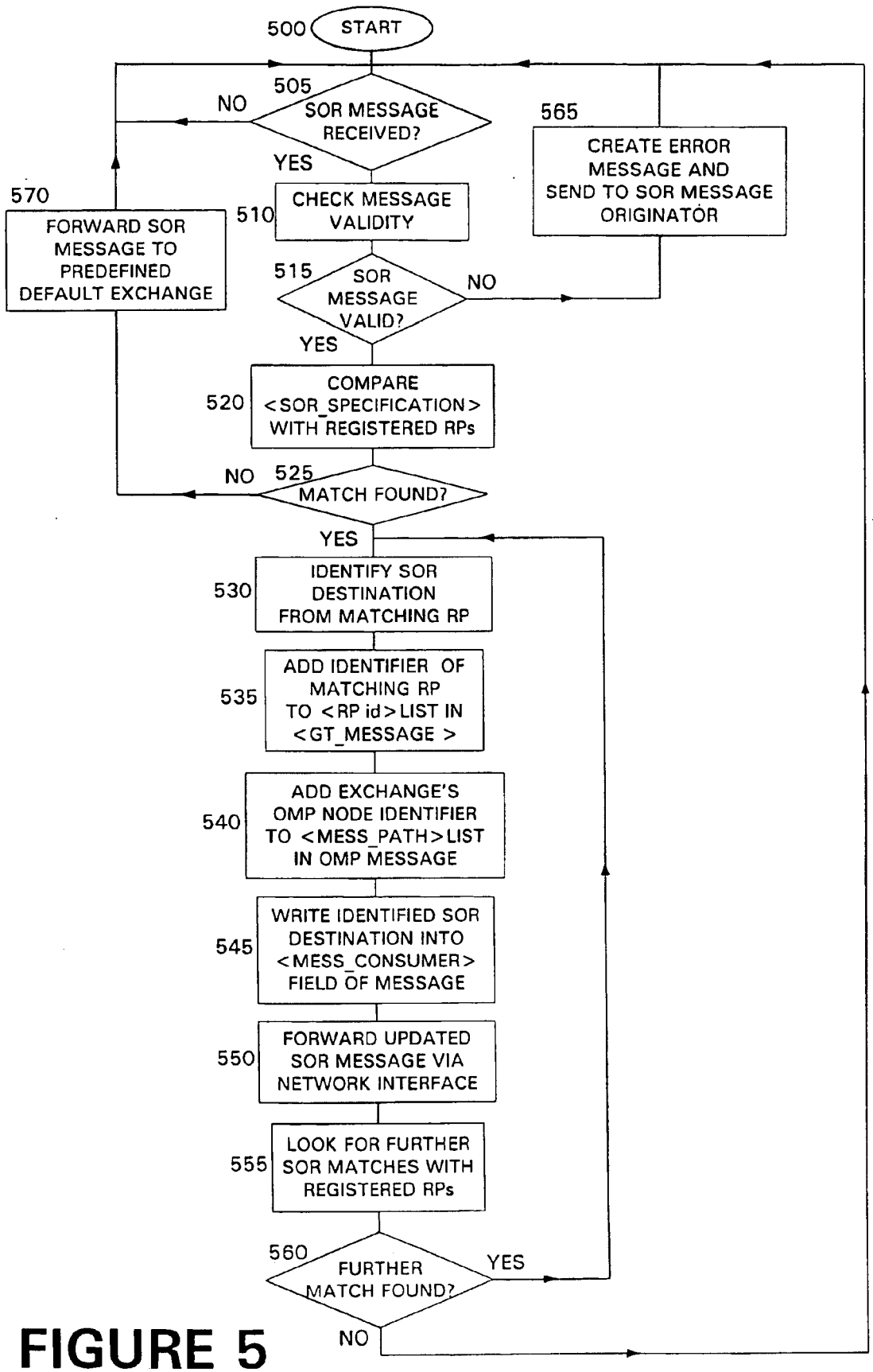
FIG. 5 is a flow diagram showing the main functional steps in operation of a requirements matching and routing module within a requirements matching broker according to embodiments of the invention.

With reference to FIG. 2 and to the flow diagram of FIG. 5, the main functional steps in operation of a Requirements Matching & Routing module 210 will now be described in more detail.

At STEP 505, the requirements matching & routing (RM&R) module 210 awaits an incoming message conveying an SOR via the network interface 200. If, at STEP 505, a message is received, then at STEP 510 the RM&R module may perform one or more checks to ensure that the message is valid. For example, the RM&R module may check that an SOR is included within the message that the SOR is specified in terms of valid requirement types (with reference to the requirements classification standards store 220 is necessary). The RM&R module may also check that the message type is valid, that the specified message source and any specified destination is known within the system and that any other contents of the message headers are valid. If, at STEP 515, the message is found to be invalid as a result of checks made at STEP 510, then the RM&R module may create an appropriate error message at STEP 565 and send it to the specified message originator, if any, via the network interface 200, before processing returns to awaiting a new message at STEP 505.

If, at STEP 515, the received SOR message is valid, then the RM&R module may proceed to compare the requirements specified by the SOR message with those specified within registered routing preferences stored in the broker's RP store 215. If, at STEP 525, as matching RP is not found, then at STEP 570 the RM&R module may forward the received SOR message, via the network interface 200, to a predefined default destination—preferably another broker—recognised as a point for collection of miscellaneous SOR messages.

If, at STEP 525, a matching RP is found, then at STEP 530 the destination specified in the RP having the matching requirement specification and the identifier of that RP may be read from the RP store 215. Having obtained this information, the RM&R module 210 may begin to update the received SOR message ready for forwarding to the identified destination. In particular, at STEP 535, the RM&R module may add the identifier of the matching RP to the <RP id> list in the message so that the new message recipient may recognize that RP registration responsible for its successful receipt of the message from the broker. Further, at STEP 540, the OMP identifier of the broker may be added to the <MESS_PATH> list within the OMP message so that the complete path of the message through the system may be recorded within the message as it progresses. Finally, at STEP 545, the destination read from the matching RP, preferably expressed as an OMP identifier, may be written as the next destination for the message within the <MESS_CONSUMER> element of the OMP message. Having updated the received SOR message, the RM&R module may then forward the message, at STEP 550, via the network interface 200, to the specified destination. At STEP 555, the RM&R module may continue searching the RP store 215 for any further matches in requirement. If, at STEP 560, a further RP is found having a matching requirement specification, then the RM&R module may repeat STEPs 530 to 555 in respect to the further matching RP, generating an updated SOR message and despatching it via the network interface 200 to the respective destination.

If, at STEP 560, no further matching RPs are found in respect of the received SOR message, then processing within the RM&R module returns to STEP 505 to check for receipt of a new SOR message.

Registration and Amendment of Routing Preferences

The sections above have referred to a messaging scheme for use by RP registration and update modules 225 in registering, amending and deleting RPs with other brokers 120. This section will now define and describe routing preference message formats for such a scheme. Such RP messages may be sent by SSAPs 115 or by brokers 120 according to their respective preferences for receiving SORs and, in respect of SSAPs, those of their users (105).

Preferably, messages related to routing preferences (RPs) may be defined using XML notation in common with other message types and with SOR formats discussed earlier. All messages may be conveyed between system participants as the message-specific content (MSC) of an appropriate OMP message, generated for example by the RP registration & update modules 225 and 440, with an appropriate message type specified by the enclosing 'GT_MESSAGE' element to identify the particular RP message type. SOR specifications used in registering or updating RPs may be similarly distinguished over those for broadcasting SORs by means of an appropriate 'application' attribute, "GT RP" for example, specified by the 'SOR_SPECIFICATION' element of the SOR.

Registered SOR RPs (215) represent a participant's interests. Brokers 120 match SORs against RPs to ensure that only those SORs of interest to a participant are broadcast to that participant. A participant's portfolio of interests may be dynamic, and brokers 120 must be updated with any changes. Preferably, SSAPs 115 and brokers 120 may be enabled to update RPs automatically, according to the needs of users (105), by creating and sending appropriate RP messages over the communications network 205.

In support of any SSAP 115 not implementing the ability to generate RP messages, brokers 120 may preferably include means for manual registration and update of RPs in the RP store 215, under the control of the RP registration and update module 225, as an administrative function by a system administrator.

The following types of RP messages may be implemented by RP Registration & Update modules 225 and 440:

| MESSAGE | COMMENTS |
| --- | --- |
| RegisterNewRP | Registers a new SOR routing preference on a broker |
| DeleteRP | Deletes an existing RP registered on broker |
| UpdateRP | Modifies an existing RP registered on a broker. An existing SOR specification may be replaced with a new one |
| QueryRPs | Requests, from a broker, a list of all RPs registered by the requester |
| RPsAvailable | Sends, to a requester, a list of all RPs registered by the requester on a broker. This is a response to QueryRPs |
| QueryRPDetails | Requests, from a broker, the details of an RP registered by the requester |
| RPDetails | Sends, to a requester, details of an RP registered by the requester on a broker. This is a response to QueryRPDetails |
| Error | Sent to the originator of a message when an error has been discovered in the message |

There follows an example of each of the message types listed in the above table. In each case, the RP update module 224 or 440 may send an RP message to a target broker by encoding the message with the MSC portion of an OMP message, specifying the broker's OMP identifier as the <MESS_CONSUMER>. Preferably, the OMP may support the use of a "wildcard" identifier as the <MESS_CONSUMER> so that the enclosed message may be broadcast by an SSAP 115 or broker 120 to all brokers 120 in the system if preferred, rather than being specifically directed to an individual broker 120. On receipt of a broadcast RegisterNewRP message, for example, a broker's RP update module 255 may determine whether or not to store an RP included with the message, according to predetermined conditions relating to "broadcast" messages. For example, the RP update module 255 may implement a policy of storing only those RPs enclosed in RegisterNewRP messages directed specifically to that broker. Alternatively, the RP update module 225 may implement a more sophisticated method of determination. For example, the RP update module 225 may perform a comparison between an <SOR_SPECIFICATION> conveyed within a broadcast RegisterNewRP message with a predetermined <SOR_SPECIFICATION> defining the specialism of the broker 120, and may ignore any such message for which the conveyed <SOR_SPECIFICATION> does not match, or at least fall within the same hierarchy of requirement type. In this way, a broker may not store a particular RP if it relates to a requirement type unlikely to be received by that broker in an SOR message, thus avoiding a potential problem of filling the RP store 215 with unused RPs.

In the following examples, the full structure of an enclosing OMP message is omitted.

RegisterNewRP:
<GT_MESSAGE type="RegisterNewRP" msig_id="M-GUID">
  <RP id="RP-GUID">
    <ORIGINATOR>
      <BROKER guid="B-GUID"/>
    </ORIGINATOR>
    <SOR id="S-GUID">
      <EXPIRY date="19971115"/>
      <LAST_REAFFIRMED date="19970906"/>
      <SOR_SPECIFICATION application="GT_RP">
        <GT_OBJECT id="CAR">
          <GT_ATT id="MANUFACTURER">Ford</>
          <GT_ATT id="MODEL">Mondeo</>
          <GT_OBJECT id="ENGINE">
            <GT_ATT id="MODEL">FR54HR</>
            <GT_ATT id="FUEL">Petrol</>
            <GT_ATT id="ENGINE_CAPACITY" units="CC">1800</>
            <GT_ATT id="NUM_VALVES">16</>
          </GT_OBJECT>
          <GT_ATT id="COLOUR">RED</>
        </GT_OBJECT>
      </SOR_SPECIFICATION>
    </SOR>
  </RP>
</GT_MESSAGE>

Each "RequestNewRP" message, as with all messages in a requirements matching system, may be assigned a unique message identified M-GUID within the system by the RP update module 225 or 440 generating it. The RP update module 225 or 440 may allocate a unique reference RP-GUID to each new routing preference to be registered at a broker. To ensure uniqueness within the system, preferably M_GUID and RP-GUID may each comprise the unique identifier of the sending node (e.g. B_GUID) followed by an appropriate sequence number allocated by the respective RP module 225 or 440. The message may specify the unique identifier B-GUID, preferably the OMP identifier, allocated to the broker or SSAP requesting the registration. The message may also specify an identifier S-GUID for the SOR being registered as a routing preference, necessary for example if a routing preference includes more than one SOR, SOR identifiers may be allocated by RP update modules 225 or 440 generating the RP and may, for example comprise the OMP identity of the requesting node followed by an appropriate sequence number. Preferably, the date of latest affirmation of validity of the SOR and a date of expiry of the SOR may be included in the SOR specified within the message. Date of affirmation may be important, for example when a supplier of second-hand cars effectively advertises a particular car currently in stock by means of an RP, the date of affirmation being the latest date of confirmation of the car's availability.

DeleteRP:
```
<GT_MESSAGE type="DeleteRP" msg_id="M-GUID">
    <RP id="RP-GUID"/>
</GT_MESSAGE>
```
To delete a registered RP, the RP update module 225 or 440 specifies the (unique) identity RP-GUID of an earlier-registered RP to be deleted.

UpdateRP:
```
<GT_MESSAGE type="UpdateRP" msg_id="M-GUID">
    <RP id="RP-GUID">
        <SOR id="S-GUID">
            <EXPIRY date="19971217"/>
            <LAST_REAFFIRMED date="19971126"/>
            <SOR_SPECIFICATION application="GT_RP">
                <GT_OBJECT id="CAR">
                    <GT_ATT id="MANUFACTURER">Ford</>
                    <GT_ATT id="MODEL">Mondeo</>
                    <GT_OBJECT id="ENGINE">
                        GT_ADD id="MODEL">FR54HR</>
                        GT_ATT id="FUEL">Petrol</>
                        GT_ATT id="ENGINE_CAPACITY" units=
                        "CC">2000</>
                        GT_ATT id="NUM_VALVES">16</>
                    </GT_OBJECT>
                    <GT_ATT id="COLOUR">ROSE_WHITE</>
                </GT_OBJECT>
            </ISOR_SPECIFICATION>
        </SOR>
    </RP>
</GT_MESSAGE>
```
If, one receiving an UpdateRP message, the broker's RP update module 225 finds that the currently registered routing preference of identity RP-GUID does not include an SOR of identity S-GUID, then the RP update module 225 may either return an error message to the message originator or it may add the specified SOR to the routing preference RP_GUID. Otherwise, the broker may replace the currently registered SOR specification with the new one.

QueryRPs:
```
<GT_MESSAGE type="QueryRPs" msg_id="M-GUID">
    <ORIGINATOR>
        <BROKER guid="B-GUID"/>
    </ORIGINATOR>
</GT_MESSAGE>
```
On receiving a QueryRP message, a broker's RP update module 225 may query its routing preferences store 215 for routing preferences including the identity B-GUID of the requester, assembling an RPsAvailable message listing those RPs currently registered.

RPsAvailable:
```
<GT_MESSAGE type="RPsAvailable" msg_id="M-GUID" original_msg_id="OM-GUID">
    <RP id="RP-GUID-1"/>
    <RP id="RP-GUID-2"/>
    <RP id="RP-GUID-3"/>
    <RP id="RP-GUID-4"/>
</GT_MESSAGE>
```
In response to a QueryRPs message, a broker's update RP module 225 may assemble the above message listing the identities of, in this example, four RPs currently registered for the requester in the RP store 215 and send it to the originator of the respective QueryRPs message. To obtain full details of each listed RP, the requester may submit, for each RP, a QueryRPDetails message. The RPsAvailable message, in conjunction with the QueryRPDetails message, may be used by SSAPs 115 and by other brokers 120, 600 to automatically discover the specialisms of particular brokers. In particular, an SSAP 115 may use information returned in response to subsequent QueryRPDetails messages to automatically determine where to register RPs for the benefit of its users (suppliers) (105).

QueryRPDetails:
```
<GT_MESSAGE type="QueryRPDetails" msg_id="M-GUID">
    <RP id="RP-GUID"/>
</GT_MESSAGE>
```
On receipt of a QueryRPDetails message, a broker's update RP module 225 may query its store of routing preferences 215 for a registered RP of identity RP-GUID and assemble an RPDetails message listing the details of that RP for transmission to the requester. If no RP of that identity can be found, then the RP update module 225 may transmit an error message to the requester.

RPDetails:
```
<GT_MESSAGE type="RPDetails" msg_id="M-GUID" original_msg_id="OM-GUID">
    <RP id="RP-GUID">
        <ORIGINATOR>
            <BROKER guid="B-GUID"/>
        </ORIGINATOR>
        <SOR id="S-GUID">
            <EXPIRY date="19971217"/>
            <LAST_REAFFIRMED date="19971126"/>
            <SOR_SPECIFICATION application="GT_RP">
                <GT_OBJECT id="CAR">
                    <GT_ATT id="MANUFACTURER">Ford</>
                    <GT_ATT id="MODEL">Mondeo</>
                    <GT_OBJECT id="ENGINE">
                        <GT_ATT id="MODEL">FR54HR</>
                        <GT_ATT id="FUEL">Petrol</>
                        <GT_ATT id="ENGINE_CAPACITY" units="CC">2000</>
                        <GT_ATT id="NUM_VALVES">16</>
                    </GT_OBJECT>
                    <GT_ATT id="COLOR">ROSE_WHITE</>
                </GT_OBJECT>
            </ISOR_SPECIFICATION>
        </SOR>
    </RP>
</GT_MESSAGE>
```
On receipt of a QueryRPDetails message, a broker's RP module 225 may assemble the above message, for example, listing the details currently stored in the broker's store of RPs 215 for routing preference RP_GUID.

Error:
```
<GT_MESSAGE type="Error" msg_id="M-GUID" original_msg_id="OM-GUID">
    <ERROR id="UID"/>
</GT_MESSAGE>
```
When any type of error is discovered in a message received by a broker, an error message may be generated by the receiving module and returned to the message sender. The error message may specify the identifier 'UID' of one of a number of predefined error types according to the nature of the error detected. Error types may be stored in a reference store accessible to all participating nodes in a requirements matching system, in the requirements classification standards store 220, 415 for example. Error types may preferably be expressed in XML format according to predetermined error object and attribute definitions.

Further Message Types

Further message types may be defined for use, in particular, with schemes for charging for valuable information. For example:

| MESSAGE | COMMENTS |
|---|---|
| RequestDetails | Requests a broker to send a supplier's/buyer's details |
| UserDetails | Supplier's/Buyer's Contact Details |
| Receipt | Sent to a message sender acknowledging receipt of a message by the receiver |

In common with messages described earlier, each of the above message types may be defined using XML notation, all definitions being stored in an accessible reference store. Specific messages may be conveyed between system participants within the MSC portion of appropriate OMP messages, in a similar way to that for all other message types discussed in relation to the present invention.

The following examples illustrate typical formats and use of objects and attributes defined for each of the messages in the above table.

```
<G_MESSAGE type="RequestDetails" msg_id="M_GUID">
RequestDetails:
    <SOR id="S_GUID">
        <ORIGINATOR>
            <BROKER guid="B_GUID"/>
            <GT_OBJECT id="GT_USER">
                <GT_ATT id="GT_USER_ID">a.miles</>
            </GT_OBJECT>
        </ORIGINATOR>
    </SOR>
</GT_MESSAGE>
UserDetails:
<GT_MESSAGE type="UserDetails" msg_id="M-GUID" original_msg_id="OM-GUID">
    <SOR id="S-GUID">
        <ORIGINATOR>
            <BROKER guid="B-GUID"/>
            <GT_OBJECT id="GT_USER">
                <GT_ATT id="GT_USER_ID">a.miles</>
                <GT_ATT id="NAME">Andrew Miles</>
                <GT_ATT id="FAMILIAR_NAME">Andy</>
                <GT_ATT id="SEX">MALE</>
                <GT_ATT id="AGE">28</>
                <GT_OBJECT id="GPS_LOCATION">
                    <GT_ATT id="LONGITUDE">54n</>
                    <GT_ATT id="LATITUDE"<67e</>
                </GT_OBJECT>
            </GT_OBJECT>
            <GT_OBJECT id="CONTACT_DETAILS">
                <GT_OBJECT id="ADDRESS">
                    <GT_ATT id="NUMBER">67</>
                    <GT_ATT id="STREET">Smugglers Cove</>
                    <GT_ATT id="TOWN">Polpero</>
                    <GT_ATT id="COUNTY">Suffolk</>
                    <GT_ATT id="COUNTRY">ENGLAND</>
                    <GT_ATT id="POST_CODE">7tf 8hg</>
                </GT_OBJECT>
                <GT_ATT id="EMAIL">andy.miles@bt-sys.bt.co.uk</>
                <GT_ATT id="TELEPHONE">01234 543667</>
                <GT_ATT id="MOBILE">45832 729473</>
                <GT_ATT id="FAX">01234 543668</>
                <GT_ATT id="TELEX">01234 543684</>
            </GT_OBJECT>
        </ORIGINATOR>
    </SOR>
</GT_MESSAGE>
Receipt:
<GT_MESSAGE type="Receipt" msg_id="M-GUID" original_msg_id="OM-GUID">
    <RECEIVED time="time" date="date">
</GT_MESSAGE>
```

Preferably every message, other than 'Receipt' message, sent within the requirements matching system may be acknowledged by the respective message recipient by means of a corresponding 'Receipt' message. 'Receipt' messages may guarantee to the sender that the original message has arrived and may enable an audit trail of messaging to be established. If a 'Receipt' message is not returned, the sender of the original message may send the original message again.

As discussed above in relation to a second embodiment of the invention, with reference to FIG. 6, a broker 600 may include a Chargeable Information Extraction & Payment module 605 and a store 610 for storing chargeable information extracted from received SOR messages. A supplier (105) may request SOR originator details, for example, withheld earlier by the broker 660, by constructing and sending to the broker 600 a 'RequestDetails' message similar to that shown in the example above. The broker 600 may be identified by the supplier (105) using information contained in an OMP message enclosing the forward SOR, for example the last broker identified within the <MESS_PATH> tags of the OMP message. On receipt of the 'RequestDetails' message by way of the broker's network interface 200, the Chargeable Information Extraction & Payment module 605 may read extracted originator details from the store 610 and may construct a 'UserDetails' message, similar to that shown in the example above, and may transmit the message to the requesting supplier (105) by way of the network interface 200. As discussed earlier, the receipt of 'RequestDetails' messages by a broker 600 may be linked with a known system for payment by suppliers (105) in respect to each such request for information.

What is claimed is:

1. A requirements matching server for use in a requirements matching system comprising at least one requirements matching server accessible by means of a communications network, said requirements matching server comprising:

an input for receiving a user request message by means of said communications network, wherein a user request message comprises a specification of user requirements and an identifier for a response contact; and routing means for forwarding a received specification of user requirements selectively via a further requirements matching server to one or more destinations determined by said routing means and accessible by means of said communications network, wherein said routing means comprise:

a store for storing at least one routing rule for controlling said routing means, wherein a routing rule comprises a specification of requirements to be routed and an identifier for one or more corresponding destinations;

comparison means for comparing a specification of user requirements conveyed by a received user request message with a specification of requirements to be routed as defined in a stored routing rule and, in dependence upon the result of said comparison, identifying one or more corresponding destinations for the forwarding of said specification of user requirements; and forwarding means for transmitting, by means of said communications network, a message conveying a specification of user requirements to each destination identified by said comparison means.

2. A requirements matching server according to claim 1, wherein said routing means further include registration means arranged, on receipt of a message conveying a routing rule, to store said routing rule in the store.

3. A requirements matching server according to claim 2, wherein said registration means are further arranged to generate a message including a message routing rule and to transmit the generated message to another requirements matching server.

4. A requirements matching server according to claim 1, including:

information extraction means for extracting a predetermined type of information from a received user request message, prior to forwarding by the routing means of a specification of user requirements contained therein, and for storing the extracted information; and means responsive, on receipt of a message conveying a request to supply said extracted information, to transmit to the sender of the extracted information request message a message including said extracted information.

5. A requirements matching server according to claim 4, wherein said predetermined type of information is the identifier for a response contact of the specification of user requirements conveyed by a received user request message.

6. A requirements matching server according to claim 4, including billing means for raising a charge in respect to the sender of each request to supply extracted information.

7. A requirements matching system, having at least one requirements matching server arranged with access to a communications network, wherein said at least one requirements matching server includes:

an input for receiving a user request message by means of said communications network, wherein a user request message comprises a specification of user requirements and an identifier for a response contact; and routing means for forwarding a received specification of user requirements selectively via a further requirements matching server to one or more destinations determined by said routing means and accessible by means of said communications network, wherein said routing means comprise:

a store for storing at least one routing rule for controlling said routing means, wherein a routing rule comprises a specification of requirements to be routed and an identifier for one or more corresponding destinations;

comparison means for comparing a specification of user requirements conveyed by a received user request message with a specification of requirements to be routed as defined in a stored routing rule and, in dependence upon the result of said comparison, identifying one or more corresponding destinations for the forwarding of said specification of user requirements; and forwarding means for transmitting, by means of said communications network, a message conveying a specification of user requirements to each destination identified by said comparison means.

8. An electronic trading system comprising:

a requirements matching server for use in a requirements matching system comprising at least one requirements matching server accessible by means of a communications network, said requirements matching server comprising:

an input for receiving a user request message by means of said communications network, wherein a user request message comprises a specification of user requirements and an identifier for a response contact; and routing means for forwarding a received specification of user requirements selectively via a further requirements matching server to one or more destinations determined by said routing means and accessible by means of said communications network, wherein said routing means comprise:

a store for storing at least one routing rule for controlling said routing means, wherein a routing rule comprises a specification of requirements to be routed and an identifier for one or more corresponding destinations;

comparison means for comparing a specification of user requirements conveyed by a received user request message with a specification of requirements to be routed as defined in a stored routing rule and, in dependence upon the result of said comparison, identifying one or more corresponding destinations for the forwarding of said specification of user requirements; and forwarding means for transmitting, by means of said communications network, a message conveying a specification of user requirements to each destination identified by said comparison means.

9. An electronic purchasing apparatus for use with a requirements matching system comprising a plurality of requirements matching servers, wherein each server of the requirements matching system includes an interface to a communications network to enable communication with other servers of the system, and wherein each server includes routing means for forwarding a specification of user requirements conveyed by a received user request message selectively via a further requirements matching server to one or more predetermined destinations selected by the routing means according to the category of requirements described in said specification, said category being one of a predefined set of categories, the apparatus comprising:

a communications network interface to enable communication with at least one requirements matching server of said requirements matching system;

a user interface for receiving a specification of user requirements; and a message generator for generating a user request message comprising a received specification of user requirements and an identifier for a response contact, and for transmitting the generated user request message to a server of said requirements matching system.

10. A requirements matching system comprising a plurality of requirements matching servers, wherein each server includes an interface to a communications network to enable communication with other servers of the system, and wherein each server includes routing means for forwarding a specification of user requirements conveyed by a received user request message selectively via a further requirements matching server to one or more predetermined destinations selected by the routing means according to the category of requirements described in said specification, said category being one of a predefined set of categories.

11. A system according to claim 10, wherein each server of the system is a server comprising:
- an input for receiving a user request message by means of said communications network, wherein a user request message comprises a specification of user requirements and an identifier for a response; and
- routing means for forwarding a received specification of user requirements selectively via a further requirements matching server to one or more destinations determined by said routing means and accessible by means of said communications network, wherein said routing means comprise:
  - a store for storing at least one routing rule for controlling said routing means, wherein a routing rule comprises a specification of requirements to be routed and an identifier for one or more corresponding destinations;
  - comparison means for comparing a specification of user requirements conveyed by a received user request message with a specification of requirements to be routed as defined in a stored routing rule and, in dependence upon the result of said comparison, identifying one or more corresponding destinations for the forwarding of said specification of user requirements; and
  - forwarding means for transmitting, by means of said communications network, a message conveying a specification of user requirements to each destination identified by said comparison means.

12. A system according to claim 10, including at least one user access server arranged with access to at least one requirements matching server of the system, said at least one user access server having a user interface for receipt of a specification of user requirements and means for generating a user request message comprising the received specification of user requirements and an identifier for a response contact, and for forwarding the generated message to said at least one requirements matching server.

13. A system according to claim 10, including at least one server providing a user interface to enable a user to receive, from one or more servers of said system of servers, user request messages conveying a specification of user requirements relating to a predetermined category of requirements.

14. A system according to claim 10, wherein each said requirements specification is defined according to a predetermined requirements representation scheme.

15. A requirements matching system according to claim 10, wherein servers of the system are arranged to forward specifications of user requirements describing a particular category of requirements, conveyed by received user request messages to a predetermined respective server of the system.

16. A method of routing a specification of user requirements from a user to a potential supplier, the method comprising:
- receiving a request message conveying said specification of user requirements;
- comparing said specification of requirements conveyed by said received request message with a specification of supplier deliverables defined in each rule of a set of at least one routing rule, wherein a routing rule comprises a specification of supplier deliverables and an identifier for one or more corresponding forwarding destinations;
- in dependence upon the result of said comparison, identifying one or more forwarding destinations corresponding to said specification of user requirements; and
- transmitting a message including said specification of user requirements to each identified forwarding destination selectively via a further requirements matching server.

17. A method according to claim 16, including extracting one or more predetermined types of information from said received request message and storing the extracted information.

18. A method as in claim 16, wherein each said specification of user requirements and of supplier deliverables is defined according to the same predetermined representation scheme.

19. An electronic trading system including a plurality of requirements matching servers, wherein each server includes an interface to a communications network to enable communications with other servers of the system, and wherein each server includes routing means for forwarding a specification of user requirements conveyed by a received user request message selectively via a further requirements matching server to one or more predetermined destinations selected by the routing means according to the category of requirements described in said specification, said category being one of a predefined set of categories.

20. An electronic trading system according to claim 19, wherein servers of the system are arranged to forward specifications of user requirements describing a particular category of requirements, conveyed by received user request messages, to a predetermined respective server of the system.

* * * * *